United States Patent
Morioka et al.

(10) Patent No.: US 11,514,376 B2
(45) Date of Patent: Nov. 29, 2022

(54) AIRLINE TICKET SYSTEM

(71) Applicant: Nomura Research Institute, Ltd., Tokyo (JP)

(72) Inventors: Taro Morioka, Tokyo (JP); Hiroyuki Nakamura, Tokyo (JP); Akira Arai, Tokyo (JP); Takashi Sagimori, Tokyo (JP); Hitoshi Matsuo, Tokyo (JP); Takeo Shimada, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 132 days.

(21) Appl. No.: 15/850,631

(22) Filed: Dec. 21, 2017

(65) Prior Publication Data

US 2018/0114150 A1    Apr. 26, 2018

Related U.S. Application Data

(63) Continuation of application No. PCT/JP2015/072580, filed on Aug. 7, 2015.

(51) Int. Cl.
*G06Q 10/02* (2012.01)
*G06Q 50/14* (2012.01)
(Continued)

(52) U.S. Cl.
CPC .......... *G06Q 10/025* (2013.01); *G06Q 10/02* (2013.01); *G06Q 30/0207* (2013.01);
(Continued)

(58) Field of Classification Search
CPC .. G06Q 10/025; G06Q 10/02; G06Q 30/0207; G06Q 30/0601; G06Q 50/14; G06Q 50/30
See application file for complete search history.

(56) References Cited

U.S. PATENT DOCUMENTS

2002/0091535 A1 *  7/2002  Kendall ................. G06Q 10/02
                                                        705/5
2012/0131050 A1 *  5/2012  Nagashima ........... G06Q 50/12
                                                        707/769

(Continued)

FOREIGN PATENT DOCUMENTS

EP       2 717 217 A1     4/2014
WO    WO 2013/059688 A1   4/2013

OTHER PUBLICATIONS

Coyle, L., Cunningham, P. (2004). Improving Recommendation Ranking by Learning Personal Feature Weights. In: Funk, P., Gonzalez Calero, P.A. (eds) Advances in Case-Based Reasoning. ECCBR 2004. Lecture Notes in Computer Science(), vol. 3155. Springer, Berlin, Heidelberg. (Year: 2004).*

(Continued)

*Primary Examiner* — Jeff Zimmerman
*Assistant Examiner* — Wayne S. Murray
(74) *Attorney, Agent, or Firm* — Rankin, Hill & Clark LLP

(57) ABSTRACT

An airline ticket sales system having a stock recording unit retaining a stock of flights, and a destination candidate extraction unit including: receiving an input of at least one condition from a user via an information processing terminal, information about a destination airport being excluded from the condition; acquiring, from the stock recording unit, information about outbound candidate flights and inbound candidate flights satisfying the condition; extracting, as candidate airports, a predetermined number from airports common to arrival airports of the outbound candidate flights and departure airports of the inbound candidate flights; selecting, based on a predetermined criterion, one from round-trip candidate flights composed of combinations of the outbound candidate flights and the inbound candidate flights among the departure airports of the outbound candidate flights specified by the condition and the respective candidate airports; and regarding the selected one as a to-be-sold round-trip flight.

14 Claims, 14 Drawing Sheets

(51) Int. Cl.
    *G06Q 30/06*     (2012.01)
    *G06Q 30/02*     (2012.01)
    *G06Q 50/30*     (2012.01)

(52) U.S. Cl.
    CPC ......... *G06Q 30/0601* (2013.01); *G06Q 50/14* (2013.01); *G06Q 50/30* (2013.01)

(56) References Cited

U.S. PATENT DOCUMENTS

2013/0103438 A1     4/2013     Vernitsky et al.
2013/0103439 A1     4/2013     Vernitsky et al.

OTHER PUBLICATIONS

GetGoing, "Latest Web Business—Overseas Edition," 6th GetGoing, Mar. 3, 2014, 3 pgs.
Adgang, "Looking for challengers! Heineken 'Leaving flight destination up to roulette,'" Jul. 17, 2013, https://adgang.jp/2013/07/34420.html, 3 pgs.
Written Opinion of the International Search Authority dated Sep. 15, 2015, in corresponding International Patent Application No. PCT/JP2015/072580, 5 pgs.
Extended European Search Report dated Nov. 26, 2018 in corresponding European Patent Application No. 15900975.2.
Cart Inc., "How about determining a destination in a fashion like tossing a coin? New sense of value of trip offered by an airline ticket booking EC site 'GetGoing'", Jun. 3, 2013, 5 pp.
International Search Report dated Sep. 15, 2015 in corresponding International Patent Application PCT/JP2015/072580.

\* cited by examiner

| ENTER CONDITIONS FOR NEW APPLICATION | | |
|---|---|---|
| OUTBOUND WAY | APRIL 17, THU ▽ | EARLY MORNING ▽ |
| INBOUND WAY | APRIL 18, FRI ▽ | EVENING ▽ |
| DEPARTURE AIRPORT | HANEDA ▽ | |
| NUMBER OF PERSONS | ADULT 4 | CHILD 0 |

SEARCH

FIG. 4

| PAYMENT | | |
|---|---|---|
| OUTBOUND WAY | APRIL 17, THU | EARLY MORNING |
| INBOUND WAY | APRIL 18, FRI | EVENING |
| DEPARTURE AIRPORT | HANEDA | |
| NUMBER OF PERSONS | ADULT 4 | CHILD 0 |

DESTINATION CANDIDATE (ARRIVAL AIRPORT)

| OBIHIRO | KOBE | HIROSHIMA | YONAGO |

| REQUIRED MILEAGE | PER PERSON AT ROUND TRIP | 5,000 MILES |

MAKE PAYMENT

NO CANCELLATION IS ALLOWED

FIG. 5

NOTIFICATION OF DESTINATION DETERMINATION

| OUTBOUND WAY | APRIL 17, THU | EARLY MORNING |
|---|---|---|
| INBOUND WAY | APRIL 18, FRI | EVENING |
| DEPARTURE AIRPORT | HANEDA | |
| NUMBER OF PERSONS | ADULT 4 | CHILD 0 |
| OUTBOUND FLIGHT | 7:05 HANEDA → 8:30 HIROSHIMA | |
| INBOUND FLIGHT | 17:50 HIROSHIMA → 19:10 HANEDA | |

FIG. 7(a)

OUTBOUND APPLICABLE FLIGHT LIST

| DATE | DEPARTURE TIME | FLIGHT NO. | DEPARTURE AIRPORT | ARRIVAL AIRPORT | AIRCRAFT | SEATING CAPACITY | STOCK QUANTITY |
|---|---|---|---|---|---|---|---|
| 4/17 | 05:40 | 001 | HND | ITM | B737 | 165 | 30 |
| 4/17 | 06:00 | 002 | HND | ITM | B767 | 261 | 20 |
| 4/17 | 07:00 | 003 | HND | ITM | B737 | 165 | 10 |
| 4/17 | 08:00 | 004 | HND | ITM | B777 | 470 | 30 |
| 4/17 | 06:00 | 005 | HND | FUK | B777 | 470 | 30 |
| 4/17 | 07:00 | 006 | HND | FUK | B777 | 470 | 20 |
| 4/17 | 08:00 | 007 | HND | FUK | B777 | 470 | 30 |
| 4/17 | 07:00 | 008 | HND | OKA | B777 | 470 | 15 |
| 4/17 | 08:50 | 009 | HND | OKA | B777 | 470 | 30 |
| 4/17 | 07:00 | 010 | HND | AXT | B737 | 165 | 30 |
| 4/17 | 07:00 | 011 | HND | KIX | B767 | 261 | 30 |
| 4/17 | 08:00 | 012 | HND | KIX | B767 | 261 | 30 |
| 4/17 | 07:00 | 013 | HND | CTS | B777 | 470 | 10 |
| 4/17 | 08:00 | 014 | HND | CTS | B777 | 470 | 15 |
| 4/17 | 07:00 | 015 | HND | KMQ | B777 | 470 | 25 |
| 4/17 | 08:00 | 016 | HND | KMQ | B777 | 470 | 20 |

FIG. 7(b)

INBOUND APPLICABLE FLIGHT LIST

| DATE | ARRIVAL TIME | FLIGHT NO. | DEPARTURE AIRPORT | ARRIVAL AIRPORT | AIRCRAFT | SEATING CAPACITY | STOCK QUANTITY |
|---|---|---|---|---|---|---|---|
| 4/18 | 17:00 | 101 | ITM | HND | B737 | 165 | 30 |
| 4/18 | 18:00 | 102 | ITM | HND | B767 | 261 | 20 |
| 4/18 | 19:00 | 103 | ITM | HND | B737 | 165 | 10 |
| 4/18 | 19:30 | 104 | ITM | HND | B777 | 470 | 10 |
| 4/18 | 17:00 | 105 | FUK | HND | B777 | 470 | 30 |
| 4/18 | 18:00 | 106 | FUK | HND | B777 | 470 | 20 |
| 4/18 | 19:00 | 107 | FUK | HND | B737 | 165 | 10 |
| 4/18 | 17:00 | 108 | OKA | HND | B777 | 470 | 30 |
| 4/18 | 18:00 | 109 | OKA | HND | B777 | 470 | 30 |
| 4/18 | 17:00 | 110 | AXT | HND | B737 | 165 | 10 |
| 4/18 | 17:00 | 111 | KIX | HND | B767 | 261 | 30 |
| 4/18 | 18:00 | 112 | KIX | HND | B767 | 261 | 30 |
| 4/18 | 17:00 | 113 | CTS | HND | B777 | 470 | 10 |
| 4/18 | 18:00 | 114 | CTS | HND | B777 | 470 | 10 |
| 4/18 | 17:00 | 115 | KMJ | HND | B777 | 470 | 30 |
| 4/18 | 18:30 | 116 | KMJ | HND | B777 | 470 | 10 |

FIG. 8

APPLICABLE AIRPORT LIST

| OUTBOUND WAY | INBOUND WAY | ROUND TRIP |
|---|---|---|
| ITM | ITM | ITM |
| FUK | FUK | FUK |
| OKA | OKA | OKA |
| AXT | AXT | AXT |
| KIX | KIX | KIX |
| CTS | | |
| KMQ | | |
| | KMJ | |

FIG. 9

| APPLICABLE AIRPORT | WEIGHT | | | | |
|---|---|---|---|---|---|
| | PER AIRPORT | PER MONTH | PER DAY OF WEEK | PER PERSON | MULTIPLY |
| ITM | 1 | 3 | 2 | 5 | 30 |
| FUK | 1 | 3 | 2 | 5 | 30 |
| OKA | 2 | 3 | 1 | 5 | 30 |
| AXT | 3 | 1 | 1 | 5 | 15 |
| KIX | 1 | 1 | 2 | 1 | 2 |

CANDIDATE AIRPORT LIST

| CANDIDATE AIRPORT |
|---|
| ITM |
| FUK |
| OKA |
| AXT |

FIG. 10 ( a )

OUTBOUND CANDIDATE FLIGHT LIST

| DATE | DEPARTURE TIME | FLIGHT NO. | DEPARTURE AIRPORT | ARRIVAL AIRPORT | AIRCRAFT | SEATING CAPACITY | STOCK QUANTITY |
|---|---|---|---|---|---|---|---|
| 4/17 | 05:40 | 001 | HND | ITM | B737 | 165 | 30 |
| 4/17 | 06:00 | 002 | HND | ITM | B767 | 261 | 20 |
| 4/17 | 07:00 | 003 | HND | ITM | B737 | 165 | 10 |
| 4/17 | 06:00 | 005 | HND | FUK | B777 | 470 | 30 |
| 4/17 | 07:00 | 006 | HND | FUK | B777 | 470 | 20 |
| 4/17 | 08:00 | 007 | HND | FUK | B777 | 470 | 30 |
| 4/17 | 07:00 | 008 | HND | OKA | B777 | 470 | 15 |
| 4/17 | 08:50 | 009 | HND | OKA | B777 | 470 | 30 |
| 4/17 | 07:00 | 010 | HND | AXT | B737 | 165 | 30 |

FIG. 10 ( b )

INBOUND CANDIDATE FLIGHT LIST

| DATE | ARRIVAL TIME | FLIGHT NO. | DEPARTURE AIRPORT | ARRIVAL AIRPORT | AIRCRAFT | SEATING CAPACITY | STOCK QUANTITY |
|---|---|---|---|---|---|---|---|
| 4/18 | 17:00 | 101 | ITM | HND | B737 | 165 | 30 |
| 4/18 | 18:00 | 102 | ITM | HND | B767 | 261 | 20 |
| 4/18 | 19:00 | 103 | ITM | HND | B737 | 165 | 10 |
| 4/18 | 17:00 | 105 | FUK | HND | B777 | 470 | 30 |
| 4/18 | 18:00 | 106 | FUK | HND | B777 | 470 | 20 |
| 4/18 | 17:00 | 108 | OKA | HND | B777 | 470 | 30 |
| 4/18 | 18:00 | 109 | OKA | HND | B777 | 470 | 30 |
| 4/18 | 17:00 | 110 | AXT | HND | B737 | 165 | 10 |

ROUND-TRIP CANDIDATE FLIGHT LIST

| OUTBOUND WAY | | | | | INBOUND WAY | | | | |
|---|---|---|---|---|---|---|---|---|---|
| DATE | DEPARTURE TIME | FLIGHT NO. | AIRPORT | STOCK QUANTITY | DATE | ARRIVAL TIME | FLIGHT NO. | AIRPORT | STOCK QUANTITY |
| 4/17 | 05:40 | 001 | ITM | 30 | 4/18 | 17:00 | 101 | ITM | 30 |
| 4/17 | 05:40 | 001 | ITM | 30 | 4/18 | 18:00 | 102 | ITM | 20 |
| 4/17 | 05:40 | 001 | ITM | 30 | 4/18 | 19:00 | 103 | ITM | 10 |
| 4/17 | 06:00 | 002 | ITM | 20 | 4/18 | 17:00 | 101 | ITM | 30 |
| 4/17 | 06:00 | 002 | ITM | 20 | 4/18 | 18:00 | 102 | ITM | 20 |
| 4/17 | 06:00 | 002 | ITM | 20 | 4/18 | 19:00 | 103 | ITM | 10 |
| 4/17 | 07:00 | 003 | ITM | 10 | 4/18 | 17:00 | 101 | ITM | 30 |
| 4/17 | 07:00 | 003 | ITM | 10 | 4/18 | 18:00 | 102 | ITM | 20 |
| 4/17 | 07:00 | 003 | ITM | 10 | 4/18 | 19:00 | 103 | ITM | 10 |
| 4/17 | 06:00 | 005 | FUK | 30 | 4/18 | 17:00 | 105 | FUK | 30 |
| 4/17 | 06:00 | 005 | FUK | 30 | 4/18 | 18:00 | 106 | FUK | 20 |
| 4/17 | 07:00 | 006 | FUK | 20 | 4/18 | 17:00 | 105 | FUK | 30 |
| 4/17 | 07:00 | 006 | FUK | 20 | 4/18 | 18:00 | 106 | FUK | 20 |
| 4/17 | 08:00 | 007 | FUK | 30 | 4/18 | 17:00 | 105 | FUK | 30 |
| 4/17 | 08:00 | 007 | FUK | 30 | 4/18 | 18:00 | 106 | FUK | 20 |
| 4/17 | 07:00 | 008 | OKA | 15 | 4/18 | 17:00 | 108 | OKA | 30 |
| 4/17 | 07:00 | 008 | OKA | 15 | 4/18 | 18:00 | 109 | OKA | 30 |
| 4/17 | 08:50 | 009 | OKA | 30 | 4/18 | 17:00 | 108 | OKA | 30 |
| 4/17 | 08:50 | 009 | OKA | 30 | 4/18 | 18:00 | 109 | OKA | 30 |
| 4/17 | 07:00 | 010 | AXT | 30 | 4/18 | 17:00 | 110 | AXT | 10 |

TIME OF DRAWING LOTS TO DETERMINE ONLY ONE-WAY OF OUTBOUND WAY

| AIRPORT | ITM | | | FUK | | | OKA | | AXT |
|---|---|---|---|---|---|---|---|---|---|
| FLIGHT NO. | 001 | 002 | 003 | 005 | 006 | 007 | 008 | 009 | 010 |
| STOCK QUANTITY | 30 | 20 | 10 | 30 | 20 | 30 | 15 | 30 | 30 |
| LOTTERY PROBABILITY | 14.0% | 9.3% | 4.7% | 14.0% | 9.3% | 14.0% | 7.0% | 14.0% | 14.0% |

TIME OF DRAWING LOTS TO DETERMINE ONLY ONE-WAY OF INBOUND WAY

| AIRPORT | ITM | | | FUK | | | OKA | | AXT |
|---|---|---|---|---|---|---|---|---|---|
| FLIGHT NO. | 101 | 102 | 103 | 105 | 106 | – | 108 | 109 | 110 |
| STOCK QUANTITY | 30 | 20 | 10 | 30 | 20 | – | 30 | 30 | 10 |
| LOTTERY PROBABILITY | 16.7% | 11.1% | 5.6% | 16.7% | 11.1% | – | 16.7% | 16.7% | 5.6% |

FIG. 21 (a)

| AIRPORT | ITM | | |
|---|---|---|---|
| FLIGHT NO. | 001 | 002 | 003 |
| 101 | 900 | 600 | 300 |
| | 25.0% | 16.7% | 8.3% |
| 102 | 600 | 400 | 200 |
| | 16.7% | 11.1% | 5.6% |
| 103 | 300 | 200 | 100 |
| | 8.3% | 5.6% | 2.8% |

× 60/165 =

| AIRPORT | ITM | | |
|---|---|---|---|
| FLIGHT NO. | 001 | 002 | 003 |
| 101 | 9.1% | 6.1% | 3.0% |
| 102 | 6.1% | 4.0% | 2.0% |
| 103 | 3.0% | 2.0% | 1.0% |

FIG. 21 (b)

| AIRPORT | FUK | | |
|---|---|---|---|
| FLIGHT NO. | 005 | 006 | 007 |
| 105 | 900 | 600 | 900 |
| | 22.5% | 15.0% | 22.5% |
| 106 | 600 | 400 | 600 |
| | 15.0% | 10.0% | 15.0% |

× 50/165 =

| AIRPORT | FUK | | |
|---|---|---|---|
| FLIGHT NO. | 005 | 006 | 007 |
| 105 | 6.8% | 4.5% | 6.8% |
| 106 | 4.5% | 3.0% | 4.5% |

FIG. 21 (c)

| AIRPORT | OKA | |
|---|---|---|
| FLIGHT NO. | 008 | 009 |
| 108 | 450 | 900 |
| | 16.7% | 33.3% |
| 109 | 450 | 900 |
| | 16.7% | 33.3% |

× 45/165 =

| AIRPORT | OKA | |
|---|---|---|
| FLIGHT NO. | 008 | 009 |
| 108 | 4.5% | 9.1% |
| 109 | 4.5% | 9.1% |

FIG. 21 (d)

| AIRPORT | AXT |
|---|---|
| FLIGHT NO. | 010 |
| 110 | 300 |
| | 100% |

× 10/165 =

| AIRPORT | AXT |
|---|---|
| FLIGHT NO. | 010 |
| 110 | 6.1% |

TIME OF DRAWING LOTS TO DETERMINE OUTBOUND WAY
IN VIEW OF WEIGHT ON RETURN TRIP

| AIRPORT | ITM | | | FUK | | | OKA | | AXT |
|---|---|---|---|---|---|---|---|---|---|
| FLIGHT NO. | 001 | 002 | 003 | 005 | 006 | 007 | 008 | 009 | 010 |
| STOCK QUANTITY | 30 | 20 | 10 | 30 | 20 | 30 | 15 | 30 | 30 |
| LOTTERY PROBABILITY | 18.2% | 12.1% | 6.1% | 11.4% | 7.6% | 11.4% | 9.1% | 18.2% | 6.1% |

TIME OF DRAWING LOTS TO DETERMINE INBOUND WAY
IN VIEW OF WEIGHT ON RETURN TRIP

| AIRPORT | ITM | | | FUK | | | OKA | | AXT |
|---|---|---|---|---|---|---|---|---|---|
| FLIGHT NO. | 101 | 102 | 103 | 105 | 106 | - | 108 | 109 | 110 |
| STOCK QUANTITY | 30 | 20 | 10 | 30 | 20 | - | 30 | 30 | 10 |
| LOTTERY PROBABILITY | 18.2% | 12.1% | 6.1% | 18.2% | 12.1% | - | 13.6% | 13.6% | 6.1% |

# AIRLINE TICKET SYSTEM

CROSS-REFERENCE TO RELATED APPLICATIONS

This application is a continuation application, under 35 U.S.C. § 111(a), of International Application No. PCT/JP2015/072580, filed Aug. 7, 2015, the entire contents of which are incorporated herein by reference.

TECHNICAL FIELD

The present invention relates to a technique for use in selling an airline ticket and, more particularly, to a technique effectively applicable to a destination recommendation type of airline ticket sales system.

BACKGROUND ART

There are commodities, each of which a specific date of validity and loses its value upon being unsold after the date of validity, such as seats of flights operated by an airline company. In a case of such commodities, it is beneficial to a seller that they are sold out by making huge discounts before the date of validity rather than remain unsold. However, constantly selling the commodities at discounts will make the number of customers who pay regular fares reduced, which may lead to a collapse of a price system.

In contrast, studied has been a technique that promotes sales of the unsold seats (hereinafter also referred to as "stock") without causing the collapse of the existing price system.

For example, by a service called "GetGoing" (see Non-Patent Document 1 and Patent Document 1), a user (s) refers to price information to narrow down, to two destination candidates, a plurality of candidates extracted from designated conditions of a "departure location", a "destination area or main purpose of trip", "travel dates", and the "number of persons", and selects and reserves one from flights in a time zone described for each of the candidates. At this time, not the user but the system randomly makes a determination of the ultimate destination. That is, the user can obtain the huge discount instead of leaving the determination of the ultimate destination to the system. This can bring a promotion of the stock for a user(s), who "wants to go somewhere", without harming the customers who pay the regular fares.

RELATED ART DOCUMENTS

Patent Document

Patent Document 1: International Publication No. WO 2013/059688

Non-Patent Document

Non-Patent Document 1: "How about determining a destination in a fashion like tossing a coin? New sense of value of trip offered by an airline ticket booking EC site 'GetGoing'", [online], Jun. 3, 2013, [Searched on Jul. 24, 2015], website URL: cart.st/corp/blog/2013/06/ecgetgoing/.

SUMMARY OF THE INVENTION

Problems to be Solved by the Invention

Use of the conventional technique as described above can bring the promotion of the stock. But, such conventional technique provides the user with an opportunity to narrow down the candidate locations to two favorable candidate locations, and thus there is a high possibility that the candidate locations (candidate locations where a lot of stock will remain unsold) which the seller wishes sold will not be selected. A similar situation exists even when the system makes the determination of the ultimate destination from many candidate locations. Thus, it is easy to occur that the candidate location which the seller wishes to sell as the stock as many as possible may not be selected.

A mechanism desired to the seller side is that the candidate location (s) to remain unsold as a lot of stock is easy to be selected. But, what "much stock" is based on is not univocal. In particular, when the stock as a target to be sold is not one way but a round trip similarly to a case of a flight in which a user who "wants to go somewhere" rides in going for a trip, efficient promotion of the stock sales is required in consideration of respective outbound and inbound stock quantities.

Therefore, an object of the present invention is to provide an airline ticket sales system capable of effectively and efficiently selling the stock for both of the user and seller in view of the stock quantities of the outbound and inbound ways between the respective candidate locations in the airline ticket sales mechanism of extracting the candidate locations and determining the ultimate destination by the system.

The above and other objects and novel characteristics of the present invention will be apparent from the description of the present specification and the accompanying drawings.

Means for Solving the Problems

The following is a brief description of an outline of the typical invention disclosed in the present application.

An airline ticket sales system according to the typical embodiment of the present invention is an airline ticket sales system for selling an airline ticket in combination with an outbound flight and an inbound flight, and has a stock recording unit retaining a stock of flights; and a destination candidate extraction unit including: receiving an input of at least one condition from a user via an information processing terminal, information about a destination airport being excluded from the condition; acquiring, from the stock recording unit, information about outbound candidate flights and inbound candidate flights satisfying the condition; extracting, as candidate airports, a predetermined number from airports common to arrival airports of the outbound candidate flights and departure airports of the inbound candidate flights; selecting, based on a predetermined criterion, one from round-trip candidate flights composed of combinations of the outbound candidate flights and the inbound candidate flights among the departure airports of the outbound candidate flights specified by the condition and the respective candidate airports; and regarding the selected one as a to-be-sold round-trip flight.

Effects of the Invention

The effects obtained by typical embodiments of the invention disclosed in the present application will be briefly described below.

That is, according to a typical embodiment of the present invention, the stock can be effectively and efficiently sold for both of the user and seller in view of the stock quantities of the outbound and inbound ways between the respective candidate locations in the airline ticket sales mechanism of extracting the candidate locations and determining the ultimate destination by the system.

BRIEF DESCRIPTIONS OF THE DRAWINGS

FIG. 4 is a diagram illustrating an outline about an example of a screen displayed on a user terminal by an airline ticket sales server in one embodiment of the present invention;

FIG. 5 is a diagram illustrating an outline about an example of a screen displayed on a user terminal by an airline ticket sales server in one embodiment of the present invention;

Figures 11, 12:
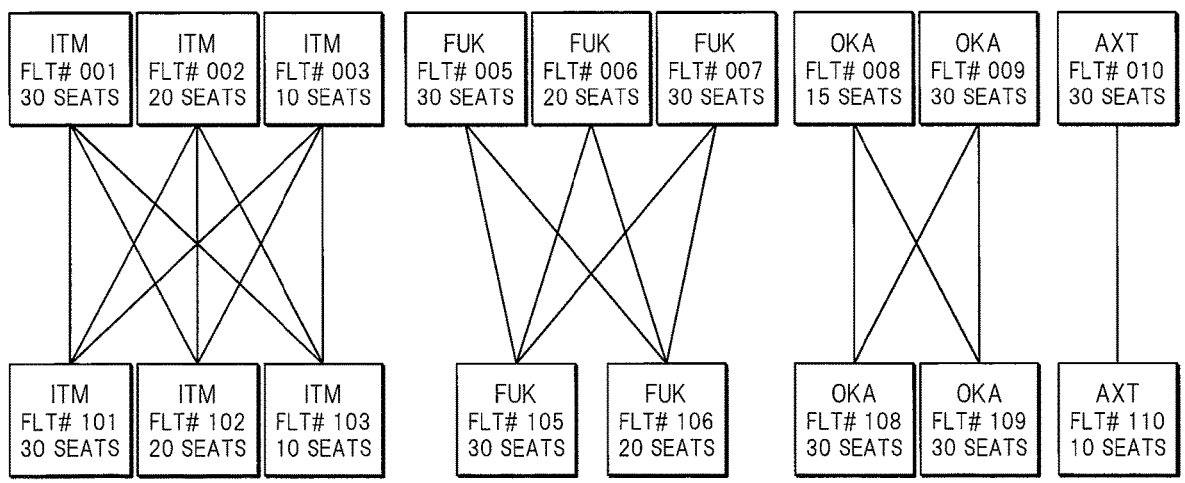
Figure 13:
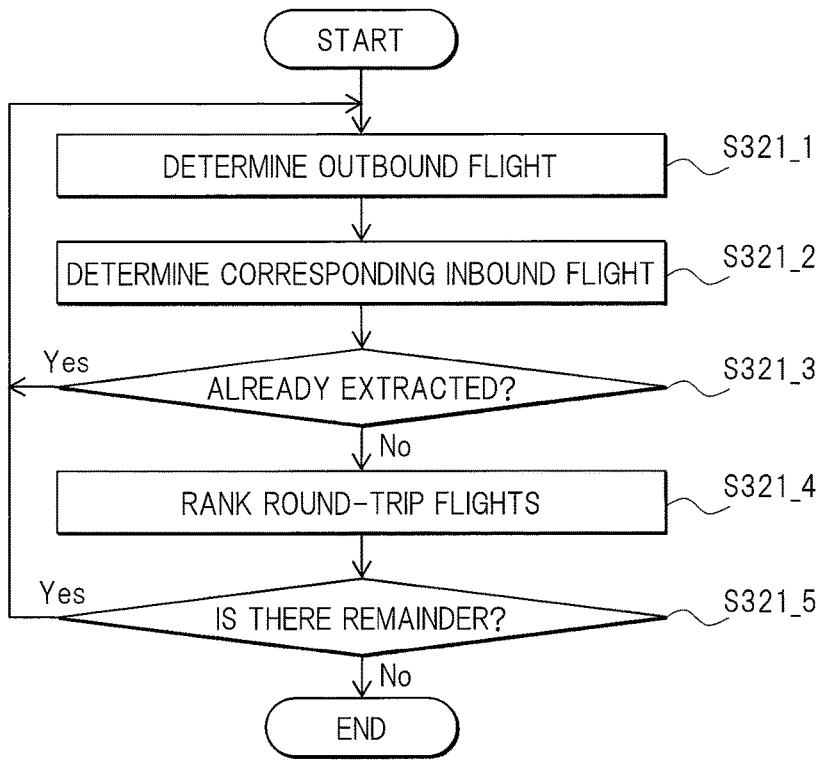
Figure 14:
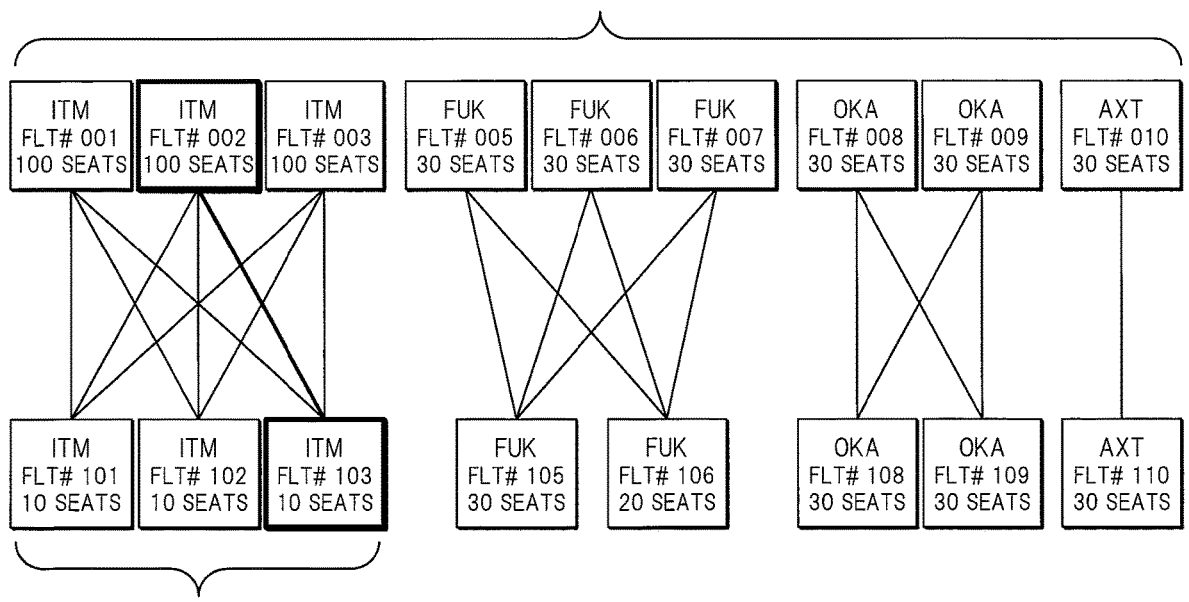
Figure 15:
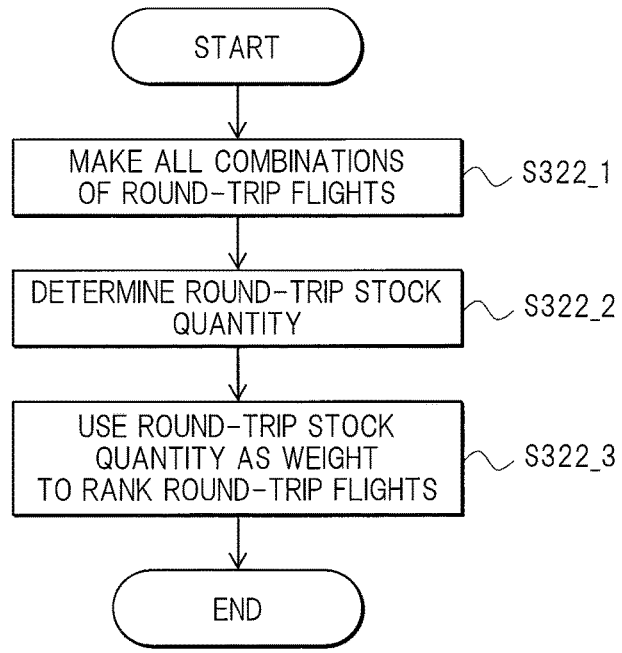
Figure 16:
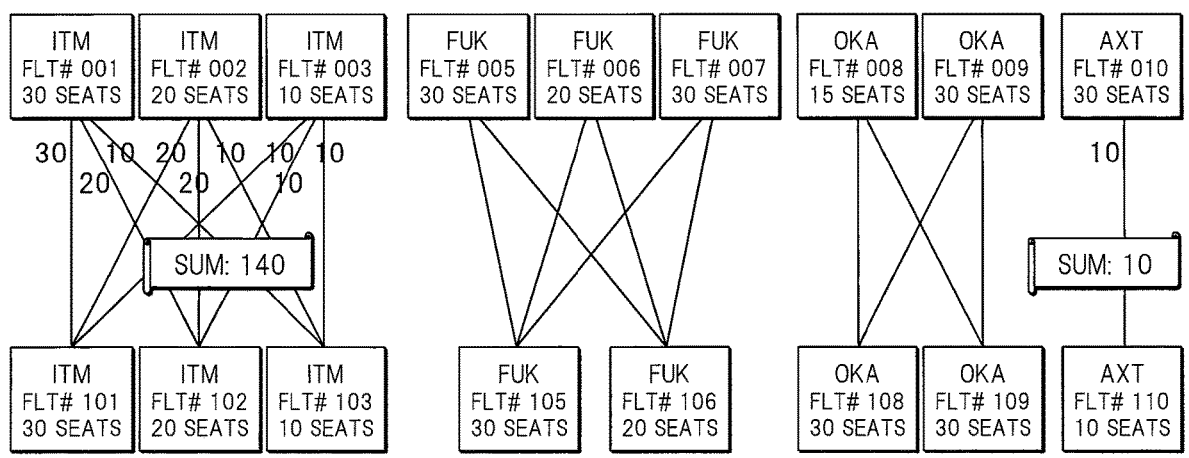
Figure 17:
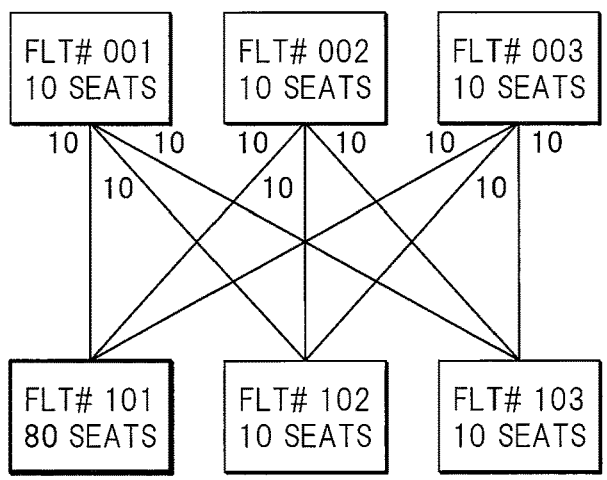
Figure 18:
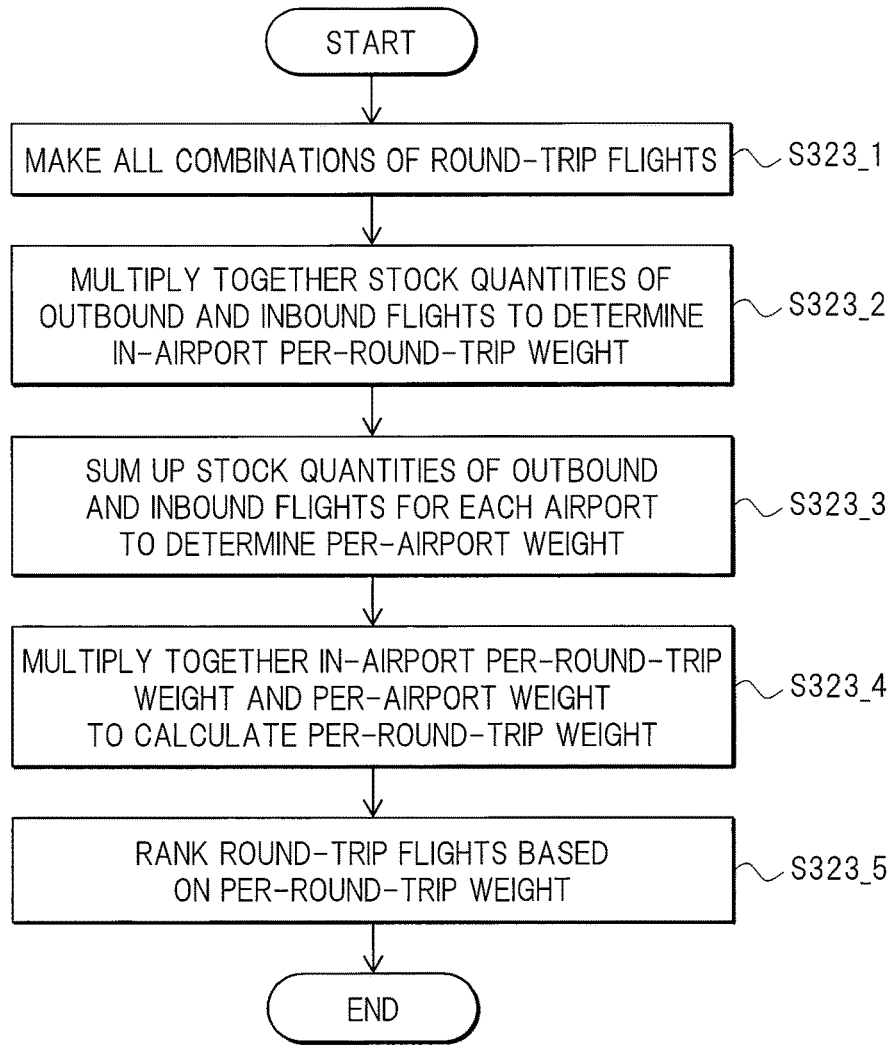
Figures 19, 20:
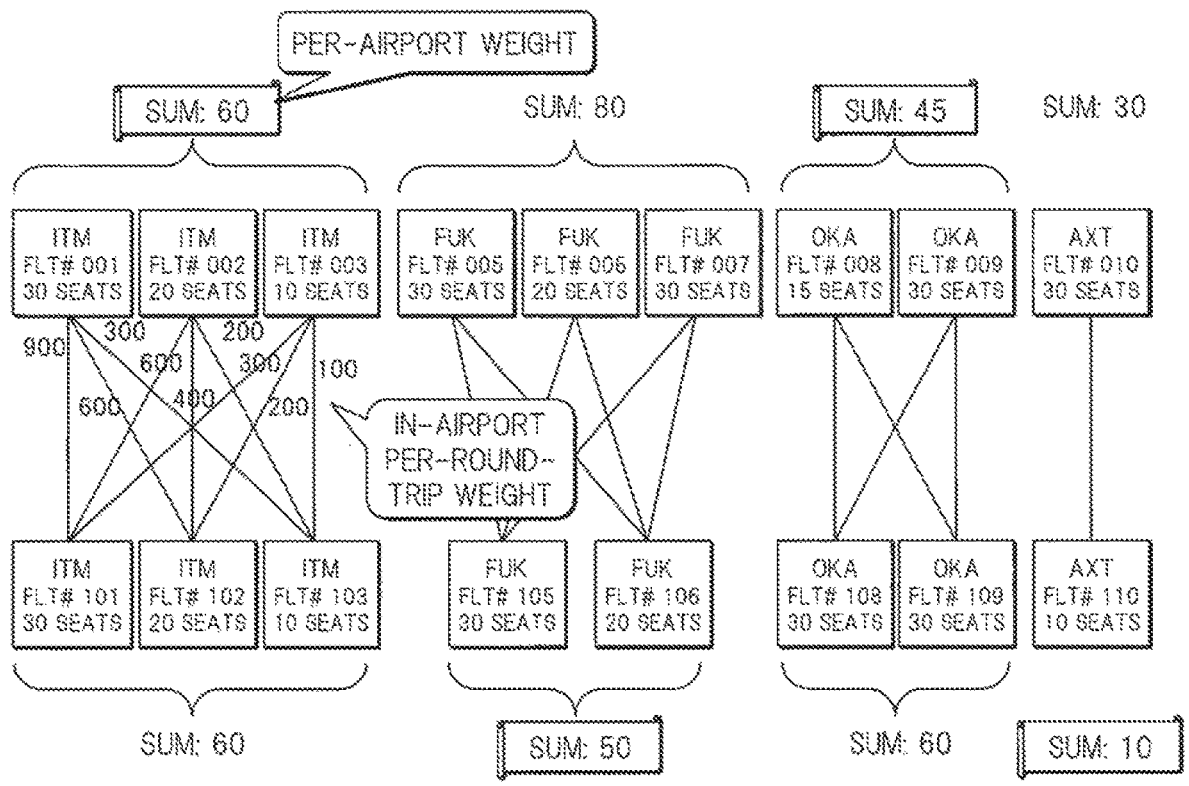
Figures 22, 23:
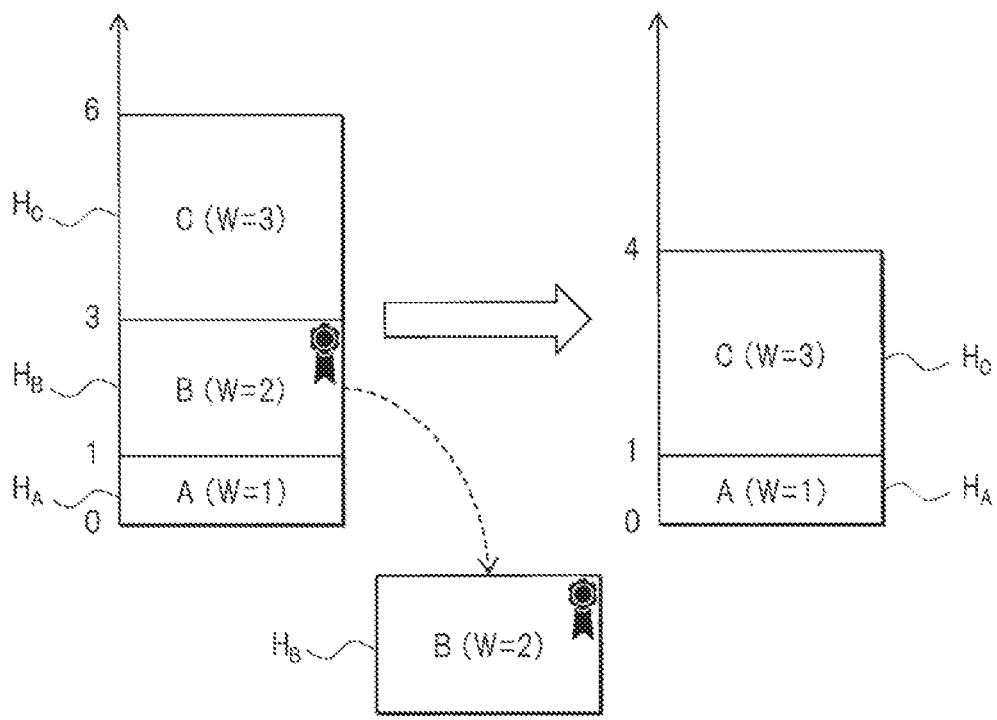

FIGS. 7(a) and 7(b) are each a diagram illustrating an outline about a specific example of an applicable flight list in one embodiment of the present invention;

FIG. 8 is a diagram illustrating an outline about a specific example of an applicable airport list in one embodiment of the present invention;

FIG. 9 is a diagram illustrating an outline about a specific example of a candidate airport list in one embodiment of the present invention;

FIGS. 10(a) and 10(b) are each a schematic diagram illustrating an outline about a specific example of a candidate flight list in one embodiment of the present invention;

FIG. 11 is a diagram illustrating an outline about a specific example of a candidate flight list in one embodiment of the present invention;

FIG. 12 is a diagram illustrating an example of status of combinations of outbound and inbound flights for a round-trip candidate flight list in one embodiment of the present invention;

FIG. 13 is a flowchart illustrating an outline about an example of a processing flow in a zeroth method for determining ranking of round-trip flights in one embodiment of the present invention;

FIG. 14 is a diagram illustrating an example in determining ranking of round-trip flights from among combinations of outbound and inbound flights by a first method in one embodiment of the present invention;

FIG. 15 is a flowchart illustrating an outline about an example of a processing flow in a second method for determining ranking of round-trip flights in one embodiment of the present invention;

FIG. 16 is a diagram illustrating an example in determining ranking of round-trip flights from among combinations of outbound and inbound flights by the second method in one embodiment of the present invention;

FIG. 17 is a diagram illustrating an example in determining ranking of a plurality of round-trip flights in the same airport in one embodiment of the present invention;

FIG. 18 is a flowchart illustrating an outline about an example of a processing flow in a third method for determining ranking of round-trip flights in one embodiment of the present invention;

FIG. 19 is a diagram illustrating an example in determining ranking of round-trip flights from among combinations of outbound and inbound flights by the third method in one embodiment of the present invention;

FIGS. 20(a) and 20(b) are each a diagram illustrating an example of lottery probabilities when weights are assigned to respective flights by the first method in one embodiment of the present invention;

FIGS. 21(a) to 21(d) are each a diagram illustrating an example of a per-round-trip weight determined by the third method in one embodiment of the present invention;

FIGS. 22(a) and 22(b) are each a diagram illustrating an example of lottery probabilities when weights are assigned to respective flights by the third method in one embodiment of the present invention; and FIG. 23 is a schematic diagram illustrating an outline about an example of a prioritization method when lottery probabilities are determined per-round-trip flights in one embodiment of the present invention.

DETAILED DESCRIPTION OF PREFERRED EMBODIMENTS

Hereinafter, embodiments of the present invention will be described in detail with reference to the accompanying drawings. Note that components having the same function are denoted by the same reference characters throughout the drawings for describing the embodiments, and the repetitive description thereof will be omitted. Meanwhile, a portion (s) denoted and described by a numeral (s) in a certain figure (s) is not illustrated again in describing the other figures, but may be denoted by the same numeral and mentioned in same cases.

<System Configuration>

Figure 1:
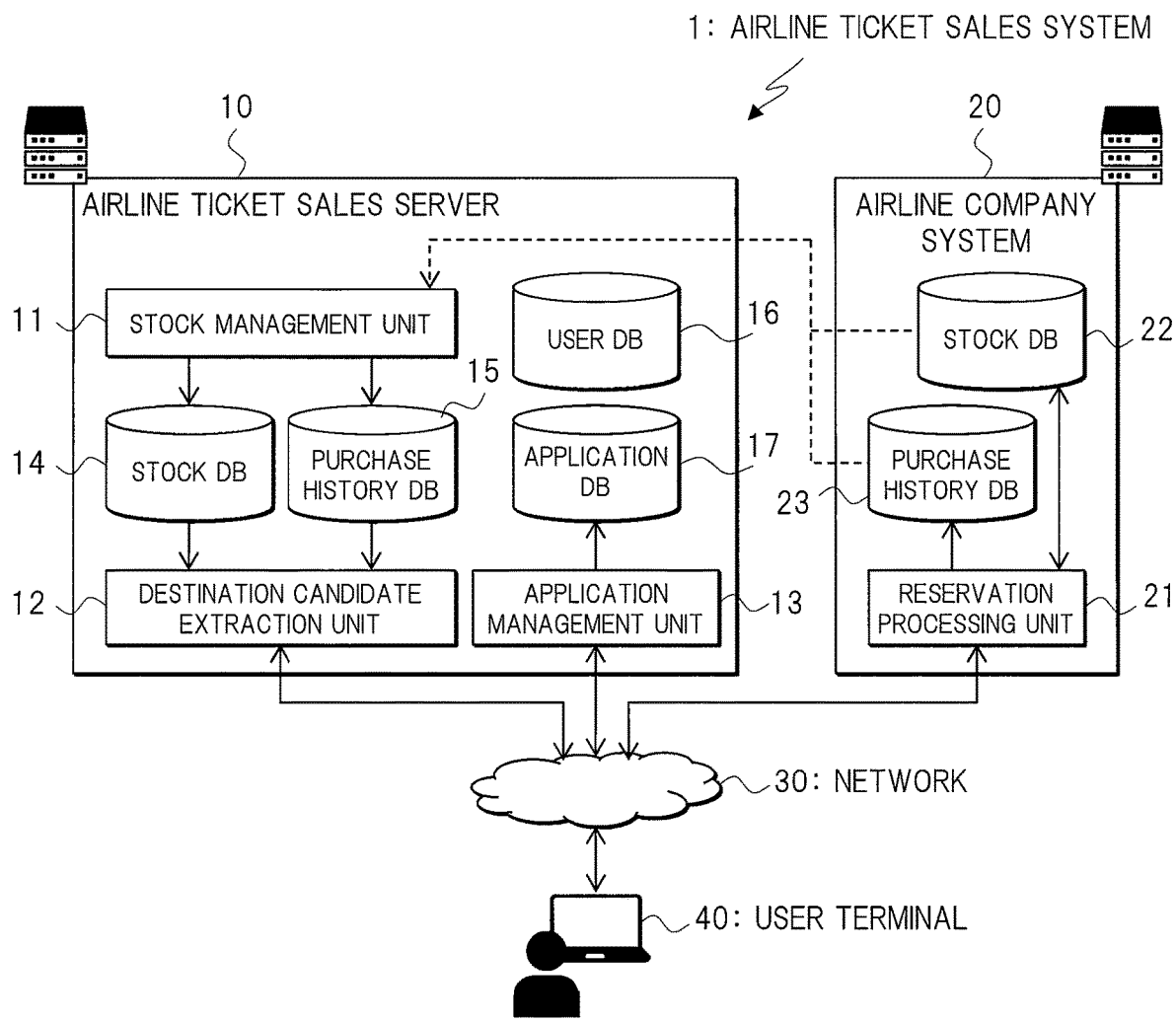
FIG. 1 is a diagram illustrating an outline about an example of a configuration of an airline ticket sales system according to one embodiment of the present invention.

FIG. 1 is a diagram illustrating an example of a configuration of an airline ticket sales system according to one embodiment of the present invention. An airline ticket sales system 1 of this embodiment is an information processing system for realizing a destination-recommending type of sales method in which the system automatically draws lots to determine, to a customer (s) (user (s)) who "wants to go somewhere", an ultimate destination and flight from a plurality of destination candidates extracted on the basis of entered conditions. By this, a candidate location (s) (candidate location where high stock seems to be remaining unsold) that a seller wishes sold is preferentially selected, which makes it possible to bring promotion of the stock sales. Meanwhile, in this embodiment, the automatically determined destination is kept secret from the user until just before his/her departure, and therefore the user can be also provided with unexpectedness and a sense of expectation of a trip.

The airline ticket sales system 1 of this embodiment includes, for example, an airline ticket sales server 10 and an airline company system 20. The server 10 is a server system implemented by a virtual server or the like installed on a server device or on a cloud computing service, the system 20 is operated by an airline company or the like to manage a vacant seat condition (stock) of each flight and to process a reservation (s) of a vacant seat (s) by a customer (s). The server 10 and the system 20 can communicate with each other via a network such as a local area network (LAN) not shown. As illustrated in FIG. 1, in this embodiment, the existing airline company system 20 that an airline company or the like has is premised, and the airline ticket sales server 10 that works together with the airline company system 20 is provided separately. However, they can be constructed, of course, as an information processing system integrated with them.

In addition, the airline ticket sales system 1 has a configuration in which a user terminal 40 including an information processing terminal such as a personal computer (PC), a tablet terminal, or a smartphone, possessed by the user can be connected to the airline ticket sales server 10 and to the airline company system 20 via a network 30, such as the Internet.

The airline company system 20 is an existing information processing system possessed by the airline company or the like, and the existing system has at least functions to receive a reservation(s) for a vacant seat(s) of a flight operated by the targeted airline company, and to hold and manage the reservation. In this embodiment, the airline company system 20 includes a reservation processing unit 21 implemented as, for example, software that operates on a not-shown operating system (OS), database management system (DBMS), or middleware such as a web server program. The airline company system 20 also has respective data stores including a stock database (DB) 22 and a purchase history DB 23, etc. each implemented by a database or the like.

The reservation processing unit 21 has an interface for receiving a reservation(s) for a vacant seat(s). When the reservation is established, the reservation processing unit 21 updates, on the basis of a content of the reservation, a contact of the stock DB 22 managing vacant seat (stock) information, and a content of the purchase history DB 23 recording the purchase history (boarding history) of the customer. The interface of the reservation processing unit 21 may be, for example, a user interface that receives a reservation input from the user terminal 40 or the like via the network 30, or may be a programming interface that receives an instruction(s) from the airline ticket sales server 10 described below, or an interface for data linkage.

The airline ticket sales server 10 is a server system having functions to receive an input(s) of conditions from the user and extract destination candidates therefrom, and to draw lots and determine an ultimate destination and flight from the candidates. The airline ticket sales server 10 includes components such as a stock management unit 11, a destination candidate extraction unit 12, and an application management unit 13, each implemented as not-shown software that operates on OS, DBMS, or middleware such as a web server program. The airline ticket sales server 10 also includes each data store of a stock DB 14, a purchase history DB 15, a user DB 16, and an application DB 17, etc. each implemented by a database, a file table, or the like.

The stock management unit 11 has a function to retain (hold) and manage, in the stock DB 14, information related to vacant seats (stock) of flights to be sold. In this embodiment, the stock DB 14 is constructed by: extracting, periodically or as needed, necessary stock information from the stock DB 22 storing latest stock information in the airline company system 20; and then performing copying, replication, or other processing. If the airline ticket sales server 10 does not have the stock DB 14, the stock management unit 11 may be configured to directly refer to the stock DB 22 in the airline company system 20. In addition to stock information, the purchase history DB 15 may be constructed in the airline ticket sales server 10 by extracting information on purchase history (boarding history) of an airline ticket(s) for each user from the purchase history DB 23 in the airline company system 20, and by performing copying, replication, or other processing.

The destination candidate extraction unit 12 has functions to receive the input of the condition(s) from the user via the user terminal 40, to extract a plurality of destination candidates on the basis of stock information in the stock DB 14, past purchase (boarding) history information in the purchase history DB 15, user attribute information registered in the user DB 16, and the like, to draw lots and determine an ultimate destination and flight therefrom, and to present the user terminal 40 with the determined destination and flight. Incidentally, details of processing contents related to the extraction of destination candidates, the determination of the ultimate destination, and the like will be described later.

The application management unit 13 has a function to receive an input of application for a purchase of an airline ticket(s) purchase from the user via the user terminal 40, and to register the application in the application DB 17. As described later, when the application is received, the user is presented only with destination candidates, and contents of the application include contents of these candidates. The application management unit 13 informs, for example, the user of the ultimate destination at predetermined timing after the reception of the application and before an outbound departure date. When the ultimate destination is determined, the reservation may automatically be established through the reservation processing unit 21 of the airline company system 20 on the basis of the application contents, or may manually be established by the user accessing the reservation processing unit 21 through the user terminal 40.

<Example of Screen Transition>

Figures 2, 3:
FIG. 2 is a diagram illustrating an outline about an example of a screen displayed on a user terminal by an airline ticket sales server in one embodiment of the present invention.
FIG. 3 is a diagram illustrating an outline about an example of a screen displayed on a user terminal by an airline ticket sales server in one embodiment of the present invention.

FIGS. 2 to 5 are each a diagram illustrating an outline about an example of a screen that the airline ticket sales server 10 of this embodiment causes the user terminal 40 to display. When the user uses a web browser, a dedicated application program, or the like (not shown) in the user terminal 40 to access the airline ticket sales server 10, a condition entry screen as illustrated in FIG. 2 is displayed first. In this screen, a desired date about each of the outbound and inbound ways is entered, and a departure time of the outbound way and an arrival time of the inbound way are each specified in a time zone.

If the departure time of the outbound way and the arrival time of the inbound way cannot be possibly specified, a range of flights to be selected by the system becomes too wide, which is difficult to be available to the user in order not to know when a flight departs and when a flight arrives. Meanwhile, if the departure time of the outbound way and the arrival time of the inbound way can be specified in detail, a range of options of flights to be selected by the system becomes too narrow, which may make it difficult to select an unexpected destination in a destination-recommending type of sales method. Thus, in this embodiment, for example, the departure time of the arrival time is sectioned and specified into and by time zones defining: 5:00 to 9:00 as "early morning", 9:00 to 12:00 as "morning", 12:00 to 17:00 as "afternoon", 17:00 to 20:00 as "evening", and 20:00 to 24:00 as "night".

Incidentally, in view of flight times being different depending on destinations in this embodiment, the time zone of the arrival time at the inbound way is specified as a rough indication about when the user returns to the departure location. However, the present embodiment is not limited to this, and a time zone of a departure time also at the inbound way may be specified so as to be selectable by making much account of a possible time of a stay at the destination.

In the screen of FIG. 2, a departure airport is further specified, and the number of passengers is entered. An arrival airport cannot be specified naturally. Although not considered in this embodiment, a purpose of a trip (e.g., spa trip and golf trip, etc.) may be specified at this time.

When the conditions are specified and entered and a "Search" button is pressed, a plurality (four in this embodiment) of candidate locations (candidate airports) extracted by a below-described method through the destination candidate extraction unit 12 of the airline ticket sales server 10 are displayed by a screen as illustrated in FIG. 3. Here, for example, if the user has previously registered preference and/or requests for the trip, and hobbies, etc. in the user DB 16 of the airline ticket sales server 10 as user attribute information, a displayed content(s) may be personalized on the basis of a content(s) of the user attribute information.

At this point of time, the ultimate destination is not yet determined by the user. When the user accepts that the user can go to any one of the candidate locations displayed in the screen of FIG. 3, a screen illustrated by FIG. 4 and performing application and payment processings is displayed. Here, since the payment is completed, the user can beforehand obtain only a right to go to any of the four candidate locations with the ultimate destination not yet determined. Incidentally, although the example of FIG. 4 illustrates a case of using mile points of a frequent flyer program as a payment method, the payment method is not particularly limited, and other payment method such as payment by a credit card may be used appropriately.

At predetermined timing after the application and the payment and before the departure date of the outbound way, a screen as illustrated in FIG. 5 notifies the user that the ultimate destination has been determined. The example of FIG. 5 indicates that Hiroshima Airport has been determined as the ultimate destination. The notification is made, for example, through a dedicated application program installed in a smartphone of the user to be targeted, or by sending the targeted user an e-mail containing a hyperlink that causes the user terminal to display the screen illustrated in FIG. 5. In this embodiment, such a notification is provided, for example, four days before the departure date of the outbound way. In other words, the ultimate destination remains indeterminate until four days before the departure date.

Thus, after the application through the screen of FIG. 4, the determination of the ultimate destination and the notification to the user by the screen of FIG. 5 can be made just before the departure of the outbound way. Therefore, the optimum destination (remaining unsold as the largest stock quantities) can be determined on the basis of the stock quantity (the number of vacant seats) just before the departure, and even a change in the stock quantity, a sudden sellout, and/or the like until just before the departure can be handled. Meanwhile, from the standpoint of the airline company or the like as sellers, there are also such sides that a situation of stock sales is not settled until just before the departure and that stock management made thus far becomes difficult.

In contrast to this, in receiving the application through the screen of FIG. 4, the ultimate destination is also determined, and registration of the reservation is made through the airline company system 20 at that point of time. Therefore, the server 10 can be configured so that the determination and the registration are reflected in the stock DB 22. In this case, they are reflected in the stock DB 22 at a time of the application, so that the stock management can be thereafter clarified and facilitated. On the other hand, the destination-recommending type of sales method with respect to the user who "wants to go somewhere" may bring a reduction in the unexpectedness and the sense of expectation of the user who is "not informed of the destination until just before the departure".

Thus, this embodiment is not limited to one of the above methods, and may select, as the ultimate destination, the optimum destination based on the stock quantity at that time just before the departure. Or, this embodiment determines the ultimate destination after receiving the application through the screen of FIG. 4, and registers the reservation, but may not notify the user of the ultimate destination but keep it secret until just before the departure, as described in the above example. This can bring achievement of both of the clarification and the facilitation of the stock management as needed, and raises in unexpectedness and a sense of expectation to the user. That is, the timing of the determination of the ultimate destination and the registration of the actual reservation, and the timing of the notification to the user can be appropriately set by making much account of any factor among optimum stock sales and stock management, and an appeal(s) to the user, etc.

<Processing Flow>

Figure 6:
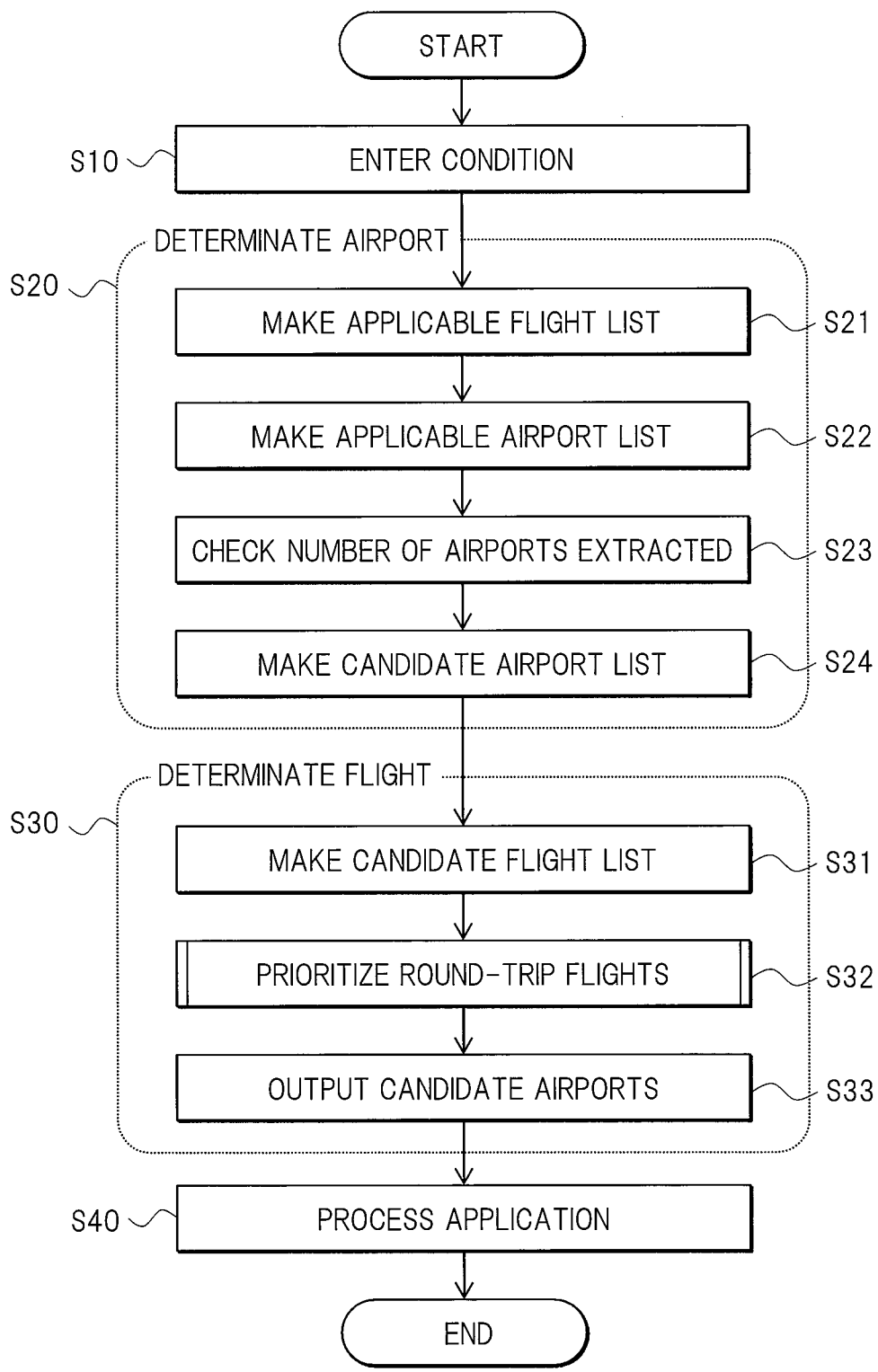
FIG. 6 is a flowchart illustrating an outline about an example of a processing flow of airline ticket sales in one embodiment of the present invention.

FIG. 6 is a flowchart illustrating an outline about an example of a processing flow of airline ticket sales in this embodiment. First, the airline ticket sales server 10 receives an input of conditions related to airline ticket sales from the user via the screen illustrated in FIG. 2 described above (S10). Upon reception of the input of conditions, the destination candidate extraction unit 12 of the airline ticket sales server 10 performs a sequence of processing steps to determine the airport for the destination candidate (S20).

First, in this example, flights that match the conditions entered at step S10 are extracted from the stock DB 14 to generate an applicable flight list (S21). Specifically, flights that correspond to the date and the time zone of each of the outbound and inbound ways specified by the entered conditions and have a stock quantity more than the number of specified persons are extracted from the stock registered in the stock DB 14 to generate the applicable flight list. Incidentally, lists of all the stocks about all the flights are reflected and registered in advance in the stock DB 14 by the stock management unit 11. The stock quantity in this case is calculated as "number of sellable seats"-"number of seats sold" for each of the flights.

FIG. 7 is a diagram illustrating an outline about a specific example of a applicable flight list. FIGS. 7(*a*) and 7(*b*) respectively illustrate examples of applicable flight lists of outbound and inbound ways that match the conditions specified in the condition entry screen of FIG. 2. Listed in FIG. 7(*a*) are flights departing from "HND (Haneda) Airport" in the early morning on April 17 and having a stock quantity of four or more. Listed in FIG. 7(*b*) are flights arriving at "HND Airport" in the evening on April 18 and having a stock quantity of four or more. Note that, as an additional condition(s) other than the conditions specified by the user, for example, flights each having a predetermined stock quantity or less based on an aircraft or a seat capacity of each of the flights may be treated as unsellable (or removed from the list). The example of FIG. 7 shows that each of the flights in shaded rows corresponds to the additional condition and is treated as unsellable.

Returning to FIG. 6, on the basis of the applicable flight lists generated at step S21, next made is an applicable airport list composed of the airports contained in the applicable flight lists (S22). Specifically, a list of arrival airports is extracted from an applicable flight list of the outbound ways, and further a list of departure airports is extracted from an applicable flight list of the inbound way. Then, the airports, which are common to both of the arrival airport list of the outbound way and the departure airport list of the inbound way and are included in them, are extracted, and the common airports are set as an applicable airport list.

Incidentally, as described above, this embodiment has a processing procedure in which the list of airports for each of the outbound and inbound ways is extracted, and then the airports common to both of the lists are extracted. However, the processing procedure is not particularly limited as long as a similar result is obtainable. For example, as processings corresponding to steps S21 and S22, such a processing procedure may be taken that: the applicable flight list only about the outbound way is first made to extract the arrival airport list; the applicable flight list about the inbound way is made so as to target only the flights whose departure airports are the airports included in the outbound arrival airport list; and the departure airports included in the inbound applicable flight list is set as a candidate airport list.

In this embodiment, as illustrated in FIG. 3, four candidate locations (airports) are presented as the destination candidates. Therefore, if the number of airports contained in the applicable airport list made at step S22 is 3 or less, a mechanism of drawing lots to select the destination from the plurality of candidate locations may not be utilizable. Thus, it is checked whether the number of airports contained in the applicable airport list made at step S22 is 3 or less (S23). For example, if the number of airports is 3 or less, a message indicating "Requested flight is not available" or the like is displayed on the user terminal 40, and the processing terminates.

FIG. 8 is a diagram illustrating an outline about a specific example of an applicable airport list. A left column of a table in the figure represents the arrival airports extracted from the outbound applicable flight list illustrated in FIG. 7(a). A central column of the table represents the departure airports extracted from the inbound applicable flight list illustrated in FIG. 7(b). A right column of the table represents a list of the airports that are common to both lists and are included in them, that is, the airports that can be combined with the round-trip flights. In this embodiment, if it is assumed that a trip taken or gone by the user is basically to go one destination from the departure location and then comes back to the departure location therefrom, the airport combined with the round-trip flights between the destination and the departure location is required as the destination location.

Returning to FIG. 6, next, the four airports to be presented to the user as the candidate locations are selected from the airports contained in the applicable airport list made at steps S22 and S23 to make a candidate airport list (S24). Specifically, for example, the respective airports contained in the round-trip applicable airport list made at steps S22 and S23 are ranked by scoring based on a predetermined criterion. The four airports in order from the top score are taken to be set as the candidate airport list. Alternatively, the four airports may be selected by drawing random lots on the basis of a lottery probability set depending on the calculated score.

In scoring, for example, a score is calculated by assigning a weight to and weights each of predetermined parameters of each airport for weighting, and then multiplying the respective weights. A basic parameter is the stock quantity of each airport. The weight is assigned so that the airport having a higher stock quantity will get a higher score. However, a weight based on another parameter may be reflected therein. For example, as a parameter (s) different for each of the airports, a weight can be set based on: whether the airport is popular (the airport where the number of users is large and the number of flights is large); whether the airport is a target of a campaign etc. held by the airline company etc.; or the like.

Moreover, even in the same airport, assigned can be the weight different per month, day of the week, time zone, or their combinations. For example, reflected can be a situation in which, even among the flights departing from the same airport, a flight (s) on Friday evening is in higher demand than flights in the other time zones of a weekday, the stock is easy to be sold, and the like. In addition, as an individual weight per user, for example, a weight may be assigned so that the same airport as the destination previously determined by drawing lots through the airline ticket sales system 1 of this embodiment, and/or the same airport as the destination that the user has already been at are difficult to be selected again.

FIG. 9 is a diagram illustrating an outline about a specific example of a candidate airport list. A left table in the figure illustrates, about each of the airports contained in the round-trip applicable airport list illustrated in FIG. 8, results obtained by assigning a weight to each for parameters different per airport, month, day of the week, and individual as described above, and then by multiplying the respective weights. The candidate airport list to be set by extracting the top four airports from the multiplication results is shown in a right table. Note that weight assignment information about what value is assigned as the weight when each parameter corresponds to any condition may be, for example, previously registered in a setting file, a table, or the like not shown and externally displayed, and may be changed as needed.

As described above, selection of the four candidate airports from the airports in the applicable airport list is performed by the scoring through the assignment of the weight to each of the parameters and by selecting the top four airports or selecting the four airports by drawing lots. For example, if the top four airports are selected and/or if a plurality of searches are made to the same user at an interval of close times, the same four airports are basically selected as the candidates as long as the stock quantity does not significantly change during the interval. Otherwise, if the stock quantity changes, there is a possibility that the candidate airports will also change. In addition, if the four airports are selected by drawing lots, the candidate airport may naturally change for each of the searches. At this time, if the user is allowed to repeat the searching many times until a favorable combination of candidate airports is obtained, an excessive load will be put on the system.

Thus, in this embodiment, if the same conditions are entered again, the candidate airports having the same contents as those of the first outputted candidate airports are outputted as long as the stock is left by recording etc., in a cookie, the respective contents of the conditions entered by the user and the candidate airports obtained from the search result. If the candidate airports are not selected from the first search results, for example, when the stock quantity is insufficient due to a change in the stock quantity, a response of "Not available" is made. This can suppress the repetitive search by the user. Instead of using the first search results every time when the same conditions are specified, a repetitive search processing may be allowed up to the particular number of times by restricting the number of times of searches. In addition, after elapsing for a given period of time such as several days later, resetting may be performed so as to be capable of making a new search again.

Returning to FIG. 6, when the four candidate airports have been determined, a sequence of processing steps is next performed to determine the flights actually sold to the user from among the flight combinations of the round-trip flights between the departure airport and each of the candidate airports (S30). In this case, the respective flights are scored by assigning weights depending on a resource (stock), and the ultimate round-trip flight is determined, by drawing lots, at lottery probabilities dependent on the scores.

Incidentally, in this embodiment as described above, flexible setting can be performed about the determination of the ultimate destination and round-trip flight, the timing of the actual registration of the reservation, and the like, and therefore there can occur the risk that the targeted flights are already out of stock depending on the setting at a time of the actual registration of the reservation by the airline company system 20 and cannot be sold.

Thus, in order to avoid the above risk in this embodiment, when the ultimate round-trip flight is determined by drawing lots, the order of other round-trip flights other than the one round-trip flight determined by drawing lots is also determined in advance by drawing lots and is set as a priority list. This makes it possible to promptly register a reservation of a next-ranked candidate flight to be targeted even when the targeted flights are already out of stock at the time of the registration of the reservation. Furthermore, until a reservation of a further next-ranked candidate flight can be registered even if the next-ranked candidate flight is also out of stock, a sequentially-ranked alternative candidate flight from the priority list and an attempt to reserve it can be made.

In addition, in the present embodiment as described above, information about the ultimate destination and flight until just before the departure even after the registration of the reservation can be set so as not to notify the user thereof. Therefore, a determination process of the round-trip flight as described above can also be kept secret from the user. Note that prioritization may be determined about all of the round-trip flights of the candidates, or prioritization is determined only about a predetermined-ranked round-trip flight from top, and determination of prioritization subsequent thereto is omitted, which may make this step efficient.

In the sequence of processing steps of step S30, first, made is a candidate flight list composed of the round-trip flights between the departure airport specified at step S10 and each of the four candidate airports contained in the candidate airport list made at step S24 (S31). Specifically, flights whose arrival airports correspond to the candidate airports are extracted from the outbound applicable flight list made at step S21 to make an outbound candidate flight list. Similarly, flights whose departure airports correspond to the candidate airports are extracted from the inbound applicable flight list made at step S21 to make an inbound candidate flight list. Then, on the basis of the outbound and inbound candidate flight lists, made is a round-trip candidate flight list containing all combinations of flights capable of going and returning.

FIGS. 10 and 11 are each a diagram illustrating an outline about a specific example of a candidate flight list. FIGS. 10(a) and 10(b) respectively illustrate examples of outbound and inbound candidate flight lists that extract the flights corresponding to the airports contained in the candidate airport list illustrated in FIG. 9 from the outbound and inbound applicable flight lists respectively illustrated in FIGS. 7(a) and 7(b) described above. FIG. 11 illustrates an example of a round-trip candidate flight list made on the basis of the outbound and inbound candidate flight lists respectively illustrated in FIGS. 10(a) and 10(b). The Figure is shown by surrounding bolding frames for each of the candidate airports.

FIG. 12 is a diagram illustrating an example of a situation of combinations of the outbound and inbound flights in the round-trip candidate flight list. In this example, shown is the situation of the combinations contained in the round-trip candidate flight list illustrated in FIG. 11. In FIG. 12, each upper stage shows the arrival airport, the flight number, and the stock quantity for each of the flights contained in the outbound candidate flight list, and each lower stage shows the departure airport, the flight number, and the stock quantity for each of the flights contained in the inbound candidate flight list. In addition, as the possible combinations of the round-trip flights, solid lines show round-robin combinations of the flights of which the outbound arrival airport and the inbound departure airport are the same. That is, each of the solid lines connecting the outbound flights and the inbound flights corresponds to each row in the round-trip candidate flight list illustrated in FIG. 11.

Returning to FIG. 6, next, a prioritizing processing of combinations of the round-trip flights in the round-trip candidate flight list made at step S31 are performed based on a predetermined condition (s) (S32). Various methods are used for the prioritizing method, and any method thereof can be adopted appropriately. For example, as a method thought of as the simplest and general method, a method in which selection and determination is made individually in order of the outbound flight and the inbound flight (or vice versa) without considering the combinations of the round-trip flights, and the ordered flights are then combined and set as round-trip flights.

FIG. 13 is a flowchart illustrating an outline about an example of a processing flow in a zeroth method for ranking round-trip flights. After a start of the processing, first, one outbound flight to be targeted from the outbound candidate flight list (S321_1) is determined by drawing lots at random. Next, one inbound flight as whose departure airport the arrival airport of the outbound flight determined at step S321_1 is regarded is determined by drawing lots at random from the inbound candidate flight list (S321_2). Thereafter, it is determined whether the round-trip flight composed of the combination of the outbound flight and the inbound flight respectively determined at steps S321_1 and S321_2 has already been extracted (S321_3). If the round-trip flight has already been extracted, the processing returns to step S321_1 to repeat these steps.

Meanwhile, if the round-trip flight to be targeted at step S321_3 has not yet been extracted, the round-trip flight to be targeted is added to the end of the priority list to determine its ranking (S321_4). The information on the ranked round-trip flights is deleted from the round-trip candidate flight list made at step S31 of FIG. 6. Then, it is determined whether there is any remainder in the round-trip candidate flight list (S321_5). If there is the remainder(s), the processing returns to step S321_1 to repeat these steps. Meanwhile, if there are no remainders, the processing terminates.

When the zeroth method as described above is adopted, it has the advantage that its logic becomes simple, and its implementation becomes easy in making the priority list of the round-trip flights. Meanwhile, regarding the determined combinations of the outbound and inbound flights, when newly another ranking is determined, the round-trip candidate flight list is required and when the ranking has already been determined, the processing of determining the combinations to be targeted becomes wasted. Thus, the zeroth method may have low processing efficiency, and may therefore require a long processing time.

Incidentally, the efficiency may be reduced also from the viewpoint of the stock sales. In the zeroth method, since it is not absolutely considered whether a stock quantity of each flight is large or low, there is possibility that the flight and airport will be sold first even if their stock quantities are low, which makes it impossible to satisfy a seller-side desire to efficiently sell the flight or airport whose stock quantity is large. Further, even if the stock quantity of the flight or airport is low, it can be randomly selected and sold. As a result, there is a case where many airports unable to be sold (sold out) appear, and there eventually occurs a case of making it impossible to select four from the candidate destination airports.

In contrast, in order to be preferentially sold from flights whose stock quantity is large, it is suggested to weight the flights by assigning, to each of them, a weight dependent on the stock quantity, and make it easier to be selected and determined by drawing lots as the stock quantity of the flights is larger (this method is referred to as "first method") instead of the random extraction like the zeroth method. FIG. 14 is a diagram illustrating an example of ranking the round-trip flights among the combinations of the outbound and inbound flights by using the first method. For explanatory convenience, it is assumed that the example of FIG. 14 is different in stock quantity from the example of the combinations of the outbound and inbound flights illustrated in FIG. 12, and each of the outbound and inbound flights has a stock quantity as illustrated.

Similarly to the zeroth method, a first method first selects one applicable outbound flight to be targeted from the outbound flights in an upper stage and, in doing so, considers and determines a weight set on the basis of the stock quantity unlike the random selection by the zeroth method. The example of FIG. 14 uses thick frames to show that "flight No. 002" has been drawn by lots and selected from the flights bound for "ITM (Itami)" Airport, each of which has a stock quantity of 100 seats and is larger in stock quantity than the flights bound for the other airports. Next, one inbound flight is determined by considering the weight assigned on the basis of the stock quantity from the flights whose departure airports are thought of as the arrival airports of the selected outbound flights among the inbound flights in a lower stage. The example of FIG. 14 uses a thick frame to show that "flight No. 103" has been drawn by lots and selected from the inbound flights departing from "ITM" Airport, each of which has a stock quantity of 10 seats.

The first method described above can consider, by the weight, whether the stock quantity is large or low. However, for example, when a deviation between the stock quantities of the outbound and inbound flights, a deviation between the stock quantities of the respective outbound flights, or a deviation between the stock quantities of the respective inbound flights are significant, an evaluation about whether the stock quantity is large or low cannot be made properly, which may bring a case of becoming inefficient sales. For example, regarding "ITM" Airport in the example of FIG. 14, a total stock quantity (number of vacant seats) of the three outbound flights is large and is 300 seats, and a total stock quantity (number of vacant seats) of the three inbound flights is only 30 seats. Therefore, there is a significant deviation therebetween. In this case, the number of persons who can make a round trip to "ITM" Airport by using these flights is only 30. That is, a transport capacity in terms of the round-trip flights to "ITM" Airport is 30 seats.

In contrast to this, regarding "AXT (Akita)" Airport in the example of FIG. 14, a stock quantity (number of vacant seats) of the one outbound flight is 30 seats, which is much less than that regarding "ITM." However, the stock quantity (number of vacant seats) of the one inbound flight is also 30 seats, which means that the transport capacity is 30 seats and is the same as that regarding "ITM." Thus, despite the same transport capacity in terms of the round-trip flight, "ITM" having the larger stock quantity of the outbound flight makes it easy to be selected overwhelmingly in determining the outbound flight by drawing lots, which consequently makes it possible to become the inefficient sales. Like the above example, depending on the airport, for example, each of flights in the daytime of weekday has a relatively large number of vacant seats while flights on Friday evening each have ordinarily almost full capacity, and thereby a significant deviation may also exist regarding the stock quantity.

FIG. 15 is a flowchart illustrating an outline about an example of a processing flow in a second method for determining ranking of round-trip flights. To eliminate the inefficiency due to a deviation between the respective stock quantities of the outbound flights and the inbound flights for each of the airports, this second method assigns a weight by considering the stock quantities of the round-trip flights. After a start of the processing, first, made are all combinations about the round-trip flights composed of combinations of the outbound and inbound flights (S322_1). This processing is the same as that of making the round-trip candidate flight list made at step S31 of FIG. 6.

Next, the stock quantity of the outbound flight or of the inbound flight, whichever is lower, about each of the round-trip flights obtained at step S322_1 is set as a stock quantity (round-trip stock quantity) of the round-trip flight (S322_2). Then, the round-trip flights are each weighted by using the round-trip stock quantity as a weight, priorities are determined by drawing lots under such a condition (S322_3), and the processing terminates. A method for determining a priority for each of the round-trip flights by drawing lots will be described later.

FIG. 16 is a diagram illustrating an example of determining ranking of the round-trip flights from among the combinations of the outbound and inbound flights through the second method. It is assumed that the example of FIG. 16 has the same stock quantities as the stock quantities in the example of the combinations of the outbound and inbound flights illustrated in FIG. 12. FIG. 16 illustrates round-trip stock quantities determined at step S322_2 about each of the round-trip flights of "ITM" Airport and the round-trip flight of "AXT" Airport. FIG. 16 also shows that a sum of the round-trip stock quantities of all the round-trip flights (9 combinations) at "ITM" Airport is 140, and a sum of the round-trip stock quantities of all the round-trip flights (1 combination) at "AXT" Airport is 10.

In the example of FIG. 16, in determining a priority for each of the round-trip flights by drawing lots, the second method assigns a weight of 140 to each of the round-trip flights at "ITM" Airport, and a weight of 10 is set to the round-trip flight at "AXT" Airport. Thus, since the weight is assigned based on the round-trip stock quantity for each of the round-trip flights, the inefficiency due to the deviation between the stock quantities of the outbound and inbound flights can be eliminated, and as the combination has the larger stock quantities of the round-trip flight, such a combination is easy to be determined by drawing lots with a higher property. Therefore, the stock is easy to efficiently sell until sellout.

On the other hand, in the example of FIG. 16, a ratio of a sum of the weights of all the round-trip flights at "ITM" Airport to a sum of the weights of all the round-trip flights at "AXT" Airport is 14:1. Therefore, in determining the ranking for each of the round-trip flights by drawing lots, a probability of selecting any one of the round-trip flights at "ITM" is 14 times higher than a probability of selecting the round-trip flight at "AXT". That is, the probability of selecting "ITM" Airport as an ultimate destination is 14 times higher than the probability of selecting "AXT" Airport.

However, when the transport capacity of each airport as described above is considered, the transport capacity of "ITM" Airport is totally 60 seats, while the transport capacity of "AXT" Airport is 10 seats. This means that a ratio between the transport capacities thereof is only 6:1. That is, as the airport has the larger number of round-trip flight combinations like "ITM" Airport, the heavier weight is assigned to the airport in comparison with the deviation of the transport capacity, and such an airport is consequently easy to determine as an ultimate destination by drawing lots.

Thus, the second method is effective when the seller wishes to preferentially sell the round-trip flight at the airport having the larger number of round-trip flight combinations (i.e., airport with many departure and arrival flights, and/or airport used by many passengers). Incidentally, even if the airport has the large number of round-trip flight combination, the number of available round-trip flight combinations decreases with an increase in the number of flights whose stock quantities are reduced (stock is sold out), so that a situation in which the heavy weight is assigned to the airport (i.e., stock is easier to sell) is also alleviated.

Meanwhile, it is desirable that, in addition to the deviation of the stock quantity for each of the airports, the deviation of the stock quantity of each of the round-trip flights in the airport is also considered. FIG. 17 is a diagram illustrating an example of determining ranking of a plurality of round-trip flights in the same airport. For example, it is assumed that three outbound flights as candidates of a certain airport are illustrated in an upper stage, three inbound flights as candidates are illustrated in a lower stage, and one round-trip flight to be targeted is drawn by lots and selected from round-trip flights composed of combinations of these flights. In this case, in the second method described above, a round-trip stock quantity of each of the round-trip flights determined at step S322_2 of FIG. 15 is corrected to 10, which is the lowest stock quantity. Thus, the weight assigned at step S322_3 to each of the round-trip flights on the basis of the round-trip stock quantity, that is, a lottery probability of prioritizing the flights becomes almost the same value.

However, in the example of FIG. 17, only the inbound "flight No. 101" has a stock of 80 seats (vacant seats) unlike the other flights each having 10 seats. Thus, it is considered as realities of sales that a lottery probability of selecting "flight No. 101" as the inbound way at a time of the prioritization is set 8 times higher than those of the other flights. That is, like the example of FIG. 17, when the stock quantities of all the outbound flights (or inbound flights) are generally low and the stock quantities of the inbound flights (or outbound flights) are generally high for a certain airport, the distribution and/or deviation about the stock quantities of the inbound flights (or outbound flights) become reflected to no weight in determining the round-trip flight in the second method.

FIG. 18 is a flowchart illustrating an outline about an example of a processing flow in a third method for determining ranking of round-trip flights. This third method avoids assigning a high weight to an airport having many round-trip-flight combinations, and sets a weight to be assigned by taking into consideration a balance between the respective stock quantities per each of the outbound and inbound ways in each airport. After a start of the processing, first, all combinations are made about round-trip flights composed of combinations of the outbound and inbound flights (S323_1). This processing is the same as that of making the round-trip candidate flight list at step S31 of FIG. 6. Next, the respective stock quantities of the outbound flights and the inbound flights are multiplied together for each of the round-trip flights obtained at step S322_1, and a multiplied value(s) is determined as an in-airport per-round-trip-flight weight(s) (S323_2).

Next, a sum of stock quantities of the respective outbound flights and a sum of stock quantities of the respective inbound flights are calculated for each airport, and the lower sum is determined as a per-airport weight (S323_3). That is, a transportable capacity of each airport described above is calculated, and is set as the per-airport weight. Then, the in-airport per-round-trip weight calculated at step S323_2 and the per-airport weight calculated at step S323_3 are multiplied together for each of the round-trip flights to calculate a per-round-trip weight (S323_4). The respective round-trip flights are drawn by lots and selected based on the per-round-trip weight, and are prioritized (S323_5), and the processing of the third method terminates.

FIG. 19 is a diagram illustrating an example of determining ranking of the round-trip flights from among the combinations of the outbound and inbound flights by the third method. The example of FIG. 19 premises stock quantities similar to the stock quantities in the example of the combinations of the outbound and inbound flights illustrated in FIG. 12. FIG. 19 illustrates, about the "ITM" Airport, in-airport per-round-trip weights calculated for each round-trip flight. FIG. 19 also illustrates a sum of stock quantities per each of the outbound and inbound flights in each airport, and illustrates that the sum having a lower value is set as a per-airport weight.

The followings will describe how a lottery probability for prioritizing the respective round-trip flights is calculated when the weights are assigned by using the third method described above. FIG. 20 is a diagram illustrating an example of the lottery probabilities when the weights are assigned to the respective flights by using the first method described above for comparison. FIGS. 20(a) and 20(b) respectively illustrate cases of using, as a weight, a stock quantity of each one-way flight of the outbound and inbound ways to calculate a lottery probability when the round-trip candidate flight list made at step S31 of FIG. 6 illustrates the example of FIG. 11 (and FIG. 12).

In this example, on the premise that a total (outbound way=215 and inbound way=180) of stock quantities of all the flights at all the airports about each of the outbound and inbound ways has a lottery probability of 100%, a value obtained by simply dividing the above lottery probabilities of 100% by the stock quantities for each flight is regarded as a lottery probability in the Figure. The first method prioritizes the round-trip flights by using the combinations of outbound flights and inbound flights sequentially drawn by lots on the basis of these obtained lottery probabilities.

FIGS. 21 and 22 each illustrate an example about how the lottery probabilities are calculated when the weights are assigned to the respective flights by using the third method. FIG. 21 is a diagram illustrating an example of the per-round-trip weights determined at step S323_4 in a processing flow of the third method illustrated in FIG. 18. FIGS. 21(a) to 21(d) respectively illustrate examples of calculating a per-round-trip weight by multiplying together the in-airport per-round-trip weights determined at step S323_2 of the processing flow illustrated in FIG. 18 and the per-airport weights determined at step S323_3 for each target of four candidate airports ("ITM," "FUK (Fukuoka)," "OKA (Naha)," and "AXT") when the round-trip candidate flight list made at step S31 of FIG. 6 illustrates the example of FIG. 11 (and FIG. 12).

In each of FIGS. 21(a) to 21(d), a first term of a left-hand side shows, as the in-airport per-round-trip weight, a value obtained by multiplying together the respective stock quantities and a matrix having all the combinations of the outbound flights and inbound flights about the targeted airport. An upper stage of each cell illustrates a value multiplied by the stock quantity, and a lower stage thereof illustrates a percentage of a ratio of the above value occupied in the entirety of each targeted airport (the following calculations will use the percentages shown in the lower stage).

Incidentally, a second term of the left-hand side shows a ratio of the per-airport weight ("ITM" Airport has a value of 60; "FUK" Airport, 50; "OKA" Airport, 45; and "AXT" Airport, 10 in the example of FIG. 19) of each airport illustrated in FIG. 19 to the sum (60+50+45+10=165) of all the airports. A right-hand side shows the per-round-trip weights obtained as the calculated result of the left-hand side in the matrix composed of the combinations of the outbound flights and inbound flights. Note that the sum of all the per-round-trip weights of all the round-trip flights illustrated in FIGS. 21(a) to 21(d) for each airport is 100%. In the third method, these per-round-trip weights are sequentially drawn as the lottery probabilities by lots, and thereby the round-trip flights are prioritized.

The third method distributes the lottery probability for each of the airports by the per-airport weight (i.e., transportable capacity described above), and can sell more adequately according to the stock quantity per airport in comparison with the second method even when, for example, a certain airport has a large stock quantity and many combinations of the round-trip flights. That is, the round-trip flights that belong to the airport having many combinations of the round-trip flights are not sold preferentially, and priority (lottery probability) cannot be affected by the number of round-trip flight combinations if the round-trip stock quantities (transportable capacities) for each airport are the same.

In addition, since the lottery probability is distributed by the in-airport per-round-trip weights multiplied by the stock quantities for each round-trip flight in the same airport, the round-trip flight having many unsold seats (large stock quantity) is easier to be sold as a round-trip flight, so that the stock can be efficiently sold until the stock sells out. In addition, since the lottery probability is distributed proportionately to the respective stock quantities of the outbound and inbound ways, the stock can be sold more adequately.

Incidentally, the third method uses the in-airport per-round-trip weights obtained by multiplying together the respective stock quantities of the outbound and inbound ways, and is thus substantially equivalent to drawing lots to select and combine individually the respective outbound and inbound ways similarly to the first method described above. Therefore, any of the methods may be used, but in the latter method of drawing lots to select and combining individually the respective outbound and inbound flights, the calculation of the in-airport per-round-trip weights is unnecessary and a scrubbing processing etc. in view of the combinations become necessary in ranking all the combinations, so that the third method can be an inefficient processing.

FIG. 22 is a diagram illustrating an example of lottery probabilities when weights are assigned to respective flights by using the third method. FIGS. 22(a) and 22(b) respectively illustrate lottery probabilities obtained by dividing, per each of the outbound and inbound ways, the lottery probabilities (per-round-trip weights in the right-hand side) of the respective round-trip flights illustrated in FIG. 21 and by compiling the respective divided lottery probabilities. As described above, the third method is equivalent to determining the round-trip flights by: drawing lots to individually select each of the outbound and inbound flights based on the lottery probabilities illustrated in FIG. 22; and combining those selected flights.

As compared with the lottery probabilities determined by the third method illustrated in FIG. 22 and the lottery probabilities determined by the first method illustrated in FIG. 20, it is understood that the lottery probabilities in the example of FIG. 22 are corrected on the basis of distribution of the respective stock quantities among the airports and distribution between the respective stock quantities of the outbound and inbound ways. For example, in the example of FIG. 22(a), even if the outbound flights have the same stock quantity of 30, the lottery probabilities of "flight No. 001 bound for ITM" and "flight No. 005 bound for FUK" are adjusted on the basis of the stock quantities of the inbound flights applicable for each airport, so that the former has a higher lottery probability.

Incidentally, in this embodiment, an element(s) selected by drawing lots from a plurality of flights having different lottery probabilities (or weights) is sequentially taken out and is classified (ranked). However, the third method is not particularly limited thereto, and can adopt anyone of arbitrary methods including publicly known methods.

FIG. 23 is a diagram illustrating an outline about an example of a prioritization method when lottery probabilities are determined per round-trip flight in this embodiment. For example, it is assumed that when three elements A, B, and C are ranked, their lottery probabilities are respectively W=1, 2, and 3. As illustrated in the left diagram, an elected range $H_A$ of the element A is set at $0<H_A \le 1$, an elected range $H_B$ of the element B is set at $1<H_B \le 3$, and an elected range $H_C$ of the element C is set at $3<H_C \le 6$. Note that order of arrangement of the elected ranges H is not limited to this order, and can be set at any order.

Thereafter, a random value P is generated in a range of $0<P \le 6$, and the element corresponding to the elected range H that the random value P belongs to is regarded as being elected. The example of FIG. 23 shows that the element B is elected. The elected element B is then added to the end of a ranking list, and the elected range $H_B$ is deleted to reconstruct the elected ranges by closing up, as illustrated in the right diagram, a gap of a portion corresponding to the elected range $H_B$ deleted from the list after which next lots are drawn. At this time, a range of a random value P generated by drawing the next lots will become $0<P \le 4$. In this way, the elected range H of the elected element is sequentially deleted, and the lots are drawn repetitively until no more elected range H is left. Thus, the ranking list about a result of ranking all the elements can be obtained.

Returning to FIG. 6, after the round-trip flights are prioritized at step S32, information on the four airports contained in the candidate airport list made at step S24 is displayed on the user terminal 40 by using the screen as illustrated in FIG. 3 described above (S33).

Then, the user determines whether to apply for a trip. If the user makes no application (changes from the display to the other and terminates an application program(s) or the like), formation on the search conditions entered at step S10 and the candidate airport list made at step S24 may be stored by using a cookie and/or the like as described above. Meanwhile, if the user makes the application, the application request from the user terminal 40 is received via the screen as illustrated in FIG. 4 described above, the application processing is performed (S40), and a sequence of processing steps is then terminated.

In the application processing, for example, each piece of information on the candidate airport list made at step S24, the priority list of the round-trip flights determined at step S32, and the like is recorded in the application DB 17 and/or the like. Then, in this embodiment, the reservation processing about the round-trip flight listed uppermost in the priority list is actually performed through the reservation processing unit 21 of the airline company system 20, and thus the stock quantities are subtracted (or the sold stock quantities are added). As described above, when the stock quantities are short in registering actual reservation by the airline company system 20, the reservation processing is performed by substituting the second uppermost round-trip flight listed in the priority list thereof. In this embodiment, the information on the round-trip flight actually reserved is notified to the user four days before the departure date through the screen as illustrated in FIG. 5.

As has been described above, the airline ticket sales system 1 according to one embodiment of the present invention can achieve a destination-recommending sales method in which the system automatically determines, by drawing lots, the ultimate destination and flight from the plurality of destination candidates extracted on the basis of the conditions entered by the user, thus making it possible to promote the stock sales by preferentially selecting a candidate location(s) that the user hopes to go to. In addition, since the automatically determined destination is kept a secret to the user until just before the departure, this embodiment can also provide the user with unexpectedness and a sense of expectation for the trip.

In addition, when the plurality of candidate locations (candidate airports) are selected or the ultimate destination airport and round-trip flight are determined, the weighting is performed by assigning the weights on the basis of various parameters including the respective stock quantities of the outbound and inbound flights, the stock quantities per airport, and the like, and the stock sales are performed from the stock having a higher priority first, which makes it possible to efficiently and effectively promote the stock sales.

In the foregoing, the invention made by the inventors of the present invention has been concretely described based on the embodiments. However, it is needless to say that the present invention is not limited to the foregoing embodiments and various modifications and alterations can be made within the scope of the present invention. For examples, the embodiments above have been described in detail so as to make the present invention easily understood, and the present invention is not always limited to the embodiment having all of the described constituent elements. Also, a part of the configuration of one embodiment may be eliminated, added to, and/or replaced with the configuration of another embodiment.

Specifically, for example, the embodiment described above has described an example of selling the combination of the outbound and inbound flights between the departure airport and the arrival airport as the destination. However, the embodiment described above is not limited to such a pattern, and may be appropriately applied to other pattern(s). For example, if an airport exists near the destination, another combination can be also made by such a so-called open-jaw that the arrival airport of the outbound flight and the departure airport of the inbound flight differ (e.g., Itami Airport and Kansai International Airport, etc.). A similar argument applies also to a case in which the departure airport of the outbound flight and the arrival airport of the inbound flight differ.

In addition, the embodiment described above has described, as an example, the system that preferentially and efficiently makes the stock sales about the combination of resources each difficult in the outbound and inbound flight tickets. However, the embodiment described above is not limited to the ticket sales, and can be applied to another system and/or method in which different resources to be assigned by the combination are properly assigned on the basis of the stock quantities of the respective resources. For example, the present invention is not limited to the airline tickets, and can be applied also to other transportation systems such as bullet trains, and further applied to wide areas such as a transportation system or rent-a-car and a hotel, a hotel and restaurant, an English conversation lecturer and a lesson room, a dispatched staff and a client of a manpower supply agency, a lunch box and drink, and the like. Furthermore, the present invention is not limited to the combination of two resources, and can be applied also to the combination of three or more resources.

INDUSTRIAL APPLICABILITY

The present invention is applicable to a destination recommendation type of airline ticket sales system.

REFERENCE SIGN LIST

1 . . . airline ticket sales system;
10 . . . airline ticket sales server; 11 . . . stock management unit; 12 . . . destination candidate extraction unit; 13 . . . application management unit; 14 . . . stock DB; 15 . . . purchase history DB; 16 . . . user DB; 17 . . . application DB;
20 . . . airline company system; 21 . . . reservation processing unit; 22 . . . stock DB; 23 . . . purchase history DB;
30 . . . network; and
40 . . . user terminal.

The invention claimed is:

1. An airline ticket system, coupled to information processing terminals each comprising a display, for issuing an airline ticket in combination with an outbound flight and an inbound flight, the airline ticket system comprising:
 a computer-readable memory storing stock quantities for seats available on flights between several airports associated with destinations, the stock quantities being updated based on a seat availability; and
 a processor communicating with the computer-readable memory, the processor being configured to execute instructions to perform a method including
  graphically presenting a condition entry screen on the display of one of the information processing terminals,
  electronically receiving, via the condition entry screen graphically presented on the display of the one of the information processing terminals, an inquiry containing at least one condition and a purpose of a trip from the one of the information processing terminals, destination information about a destination airport being excluded from the inquiry,
  acquiring, from the computer-readable memory, flight information about outbound candidate flights and inbound candidate flights satisfying the at least one condition, based on the stock quantities, extracting a predetermined number of candidate airports common to arrival airports of the outbound candidate flights and inbound departure airports of the inbound candidate flights, graphically presenting the predetermined number of candidate airports on the display with maps around the candidate airports and pictures which are related to the purpose of the trip and associated with the maps, assigning a weight to each of a plurality of round-trip candidate flights composed of combinations of the outbound candidate flights and the inbound candidate flights, the weight being registered in the computer-readable memory and updated based on a round-trip stock quantity of each of the plurality of round-trip candidate flights, wherein a lowest quantity among a first stock quantity of the outbound flight and a second stock quantity of the inbound flight related to each of the round-trip candidate flights is set as the round-trip stock quantity, and the first stock quantity and the second stock quantity are stored in the computer-readable memory as the stock quantities and updated based on the seat availability, determining, based on a predetermined criterion including the weight assigned to each of the plurality of round-trip candidate flights, a selected round-trip flight from the round-trip candidate flights among at least one outbound departure airport specified by the at least one condition and the candidate airports, and graphically providing the flight information on the selected round-trip flight to the display of the one of the information processing terminals, wherein the processor records, in a cookie, the inquiry electronically received from the one of the information processing terminals, and graphically presents, on the display, the candidate airports having the same contents as those of the candidate airports which have been extracted first if the same inquiry recorded in the cookie is electrically received again from the one of the information processing terminals for a predetermined period of time, as long as the stock quantities remain.

2. The airline ticket system according to claim 1, wherein in extracting the predetermined number of the candidate airports, the processor is configured to assign a weight to each of common airports common to the arrival airports of the outbound candidate flights and the inbound departure airports of the inbound candidate flights based on at least one parameter, the at least one parameter including at least one of an airport attribute for each of the common airports, a month related to at least one of an outbound departure date and an inbound departure date, and a day of a week related to the at least one of the outbound departure date and the inbound departure date.

3. The airline ticket system according to claim 1, wherein a per-airport weight is assigned based on a lowest sum among a first sum of outbound stock quantities of outbound flights and a second sum of inbound stock quantities of inbound flights about all the round-trip candidate flights related to the candidate airports.

4. The airline ticket system according to claim 1, wherein an in-airport per-round-trip weight is assigned based on a value obtained by multiplying together an outbound stock quantity of the outbound flight and an inbound stock quantity of the inbound flight about each of the round-trip candidate flights related to the candidate airports.

5. The airline ticket system according to claim 1, wherein after performing a first response to the inquiry containing the at least one condition, the processor is further configured to send the first response again upon receiving the at least one condition again within a predetermined time period.

6. The airline ticket system according to claim 1, wherein the processor is further configured, in assigning the weight to each of the round-trip candidate flights, to increase the weight as stock quantity increases.

7. The airline ticket system according to claim 1, wherein the processor is further configured to
generate a list of the round-trip candidate flights in order of priority ranking, the list including the selected round-trip flight, and
replace the selected round-trip flight with a next-ranked round-trip candidate flight, when the selected round-trip flight is out of stock when a reservation is requested.

8. The airline ticket system according to claim 1, wherein the processor is further configured to generate a list of the round-trip candidate flights in order of priority ranking based on a corresponding order of a random value generated for each round-trip candidate flight that has a lottery probability corresponding to the weight, the list including the selected round-trip flight.

9. The airline ticket system according to claim 1, wherein the processor is further configured to notify the one of the information processing terminals of the selected round-trip flight a predetermined time after the at least one condition is received and before an outbound departure date of the selected round-trip flight.

10. The airline ticket system according to claim 1, wherein the processor is further configured to
register a reservation of the selected round-trip flight when the at least one condition is received, and
notify the one of the information processing terminals of a result of the reservation after a predetermined period of time has elapsed since registration of the reservation.

11. The airline ticket system according to claim 1, wherein the computer-readable memory further stores at least one of a preference for the trip, a request for the trip or a hobby of a user as user attribute information, and
the processor is further configured to graphically present, on the display, a screen personalized on the basis of the user attribute information.

12. An airline ticket system, coupled to information processing terminals each comprising a display, for issuing an airline ticket in combination with an outbound flight and an inbound flight, the airline ticket system comprising:
a computer-readable memory retaining a stock of flights which is updated based on a seat availability; and
a processor communicating with the computer-readable memory, the processor being configured to execute instructions to perform a method including
graphically presenting a condition entry screen on the display of one of the information processing terminals,
electronically receiving, via the condition entry screen graphically presented on the display of the one of the information processing terminals, an inquiry containing at least one condition and a purpose of a trip from the one of the information processing terminals, destination information about a destination airport being excluded from the inquiry,
acquiring, from the computer-readable memory, flight information about outbound candidate flights and inbound candidate flights satisfying the at least one condition, extracting a predetermined number of candidate airports common to arrival airports of the outbound candidate flights and inbound departure airports of the inbound candidate flights, graphically presenting the predetermined number of candidate airports on the display with maps around the candidate airports and pictures which are related to the purpose of the trip and associated with the maps, assigning a weight to each of a plurality of round-trip candidate flights composed of combinations of the outbound candidate flights and the inbound candidate flights, the weight being registered in the computer-readable memory and updated based on multiplication of a per-airport weight and an in-airport per-round-trip weight, the per-airport weight being set based on a first stock quantity for each of the candidate airports corresponding to the round-trip candidate flights, the in-airport per-round-trip weight being set based on a second stock quantity for each of the round-trip candidate flights available in the candidate airports, the first stock quantity and the second stock quantity are stored in the computer-readable memory as the stock of flights and updated based on the seat availability, determining, based on a predetermined criterion including the weight assigned to each of the plurality of round-trip candidate flights, a selected round-trip flight from the round-trip candidate flights among at least one outbound departure airport specified by the at least one condition and the candidate airports, and graphically providing the flight information on the selected round-trip flight to the display of the one of the information processing terminals, wherein the processor records, in a cookie, the inquiry electronically received from the one of the information processing terminals, and graphically presents, on the display, the candidate airports having the same contents as those of the candidate airports which have been extracted first if the same inquiry recorded in the cookie is electrically received again from the one of the information processing terminals for a predetermined period of time, as long as the stock quantities remain.

13. An airline ticket system, coupled to information processing terminals each comprising a display, for issuing an airline ticket in combination with an outbound flight and an inbound flight, the airline ticket system comprising:

a computer-readable memory storing stock quantities for seats available on flights between several airports associated with destinations;

a server communicating with the computer-readable memory and updating the stock quantities based on a seat availability; and a processor communicating with the computer-readable memory and the server, the processor being configured to execute instructions to perform a method including graphically presenting a condition entry screen on the display of one of the information processing terminals, electronically receiving, via the condition entry screen graphically presented on the display of the one of the information processing terminals, an inquiry containing at least one condition and a purpose of a trip from the one of the information processing terminals, destination information about a destination airport being excluded from the inquiry, acquiring, from the computer-readable memory, flight information about outbound candidate flights and inbound candidate flights satisfying the at least one condition, based on the stock quantities, extracting a predetermined number of candidate airports common to arrival airports of the outbound candidate flights and inbound departure airports of the inbound candidate flights, graphically presenting the predetermined number of candidate airports on the display with maps around the candidate airports and pictures which are related to the purpose of the trip and associated with the maps, assigning a weight to each of a plurality of round-trip candidate flights composed of combinations of the outbound candidate flights and the inbound candidate flights, the weight being registered in the computer-readable memory and updated based on a round-trip stock quantity of each of the plurality of round-trip candidate flights, wherein a lowest quantity among a first stock quantity of the outbound flight and a second stock quantity of the inbound flight related to each of the round-trip candidate flights is set as the round-trip stock quantity, and the first stock quantity and the second stock quantity are stored in the computer-readable memory as the stock quantities and updated based on the seat availability, determining, based on a predetermined criterion including the weight assigned to each of the plurality of round-trip candidate flights, a selected round-trip flight from the round-trip candidate flights among at least one outbound departure airport specified by the at least one condition and the candidate airports, and graphically providing the flight information on the selected round-trip flight to the display of the one of the information processing terminals, wherein the processor records, in a cookie, the inquiry electronically received from the one of the information processing terminals, and graphically presents, on the display, the candidate airports having the same contents as those of the candidate airports which have been extracted first if the same inquiry recorded in the cookie is electrically received again from the one of the information processing terminals for a predetermined period of time, as long as the stock quantities remain.

14. An airline ticket system, coupled to information processing terminals each comprising a display, for issuing an airline ticket in combination with an outbound flight and an inbound flight, the airline ticket system comprising:

a computer-readable memory storing stock quantities for seats available on flights between several airports associated with destinations, the stock quantities being updated based on a seat availability; and a processor communicating with the computer-readable memory, the processor being configured to execute instructions to perform a method including graphically presenting a condition entry screen on the display of one of the information processing terminals, electronically receiving, via the condition entry screen graphically presented on the display of the one of the information processing terminals, an inquiry containing at least one condition and a purpose of a trip from the one of the information processing terminals, destination information about a destination airport being excluded from the inquiry, acquiring, from the computer-readable memory, flight information about outbound candidate flights and inbound candidate flights satisfying the at least one condition, based on the stock quantities, extracting a predetermined number of candidate airports common to arrival airports of the outbound candidate flights and inbound departure airports of the inbound candidate flights, graphically presenting the predetermined number of candidate airports on the display with maps around the candidate airports and pictures which are related to the purpose of the trip and associated with the maps, assigning a weight to each of a plurality of round-trip candidate flights composed of combinations of the outbound candidate flights and the inbound candidate flights, the weight being registered in the computer-readable memory and updated based on a round-trip stock quantity of each of the plurality of round-trip candidate flights, wherein a lowest quantity among a first stock quantity of the outbound flight and a second stock quantity of the inbound flight related to each of the round-trip candidate flights is set as the round-trip stock quantity, and the first stock quantity and the second stock quantity are stored in the computer-readable memory as the stock quantities and updated based on the seat availability, determining, based on a predetermined criterion including the weight assigned to each of the plurality of round-trip candidate flights, a selected round-trip flight from the round-trip candidate flights among at least one outbound departure airport specified by the at least one condition and the candidate airports, and graphically providing the flight information on the selected round-trip flight to the display of the one of the information processing terminals, wherein the processor records, in a cookie, the inquiry electronically received from the one of the information processing terminals, and graphically presents, on the display, the candidate airports having the same contents as those of the candidate airports which have been extracted first if the same inquiry recorded in the cookie is electrically received again from the one of the information processing terminals, as long as the stock quantities remain, wherein a repetitive search processing of the candidate airports is allowed up to a particular number of times for a predetermined period of time by restricting a number of times of searches, and after the predetermined period of time, resetting is performed so as to be capable of making a new search of the candidate airports again.

* * * * *